(12) United States Patent
Fukuda et al.

(10) Patent No.: US 10,257,338 B2
(45) Date of Patent: *Apr. 9, 2019

(54) METHOD AND APPARATUS TO CONTROL A STATE OF MUSIC REPRODUCING DEVICE THROUGH WIRELESS COMMUNICATOR

(71) Applicant: Panasonic Intellectual Property Management Co., Ltd., Osaka (JP)

(72) Inventors: Hikaru Fukuda, Fukuoka (JP); Hideyuki Matsuo, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/165,978

(22) Filed: May 26, 2016

(65) Prior Publication Data

US 2016/0269532 A1 Sep. 15, 2016

Related U.S. Application Data

(63) Continuation of application No. PCT/JP2014/006128, filed on Dec. 9, 2014.

(30) Foreign Application Priority Data

Dec. 10, 2013 (JP) ................................ 2013-255336

(51) Int. Cl.
*H04M 3/00* (2006.01)
*H04M 1/725* (2006.01)
(Continued)

(52) U.S. Cl.
CPC ... *H04M 1/72533* (2013.01); *H04M 1/72502* (2013.01); *H04M 1/72558* (2013.01);
(Continued)

(58) Field of Classification Search
CPC ......... H04M 1/72533; H04M 1/72502; H04M 1/72558; H04M 1/72597; H04M 19/04;
(Continued)

(56) References Cited

U.S. PATENT DOCUMENTS 4,558,181 A * 12/1985 Blanchard ............ H04M 11/045
379/40
5,671,267 A * 9/1997 August ............. H04M 1/72502
379/102.03
(Continued)

FOREIGN PATENT DOCUMENTS

EP 1 104 150 A2 5/2001
JP 63-187844 A 8/1988
(Continued)

OTHER PUBLICATIONS

Extended European Search Report, dated Dec. 13, 2016, for corresponding EP Application No. 14869352.6-1972 / 3082322, 9 pages.
(Continued)

*Primary Examiner* — Kathy W Wang-Hurst
*Assistant Examiner* — B M M Hannan
(74) *Attorney, Agent, or Firm* — Seed IP Law Group LLP

(57) ABSTRACT

Provided is a telephone apparatus including a wireless communicator that performs wireless communication of data with a music reproducing device, a controller that remotely controls the music reproducing device through the wireless communicator, a speaker, a sound processor that reproduces sound data from the music reproducing device and outputs the sound data to the speaker, and a call controller that detects outgoing or incoming of a call through a telephone line and restricts output of sound data from the music reproducing device in a case where the incoming or outgoing of a call is detected while the sound data is output as a sound.

4 Claims, 10 Drawing Sheets

(51) Int. Cl.
*H04N 21/4227* (2011.01)
*H04N 21/436* (2011.01)
*H04N 21/439* (2011.01)
*H04N 21/4788* (2011.01)
*H04N 21/63* (2011.01)
*H04N 21/81* (2011.01)
*H04N 21/61* (2011.01)

(52) U.S. Cl.
CPC ..... *H04N 21/4227* (2013.01); *H04N 21/4396* (2013.01); *H04N 21/43615* (2013.01); *H04N 21/4788* (2013.01); *H04N 21/632* (2013.01); *H04N 21/8113* (2013.01); *H04M 1/72597* (2013.01); *H04M 2250/02* (2013.01); *H04N 21/6181* (2013.01); *H04N 21/6187* (2013.01)

(58) Field of Classification Search
CPC ............ H04M 2250/02; H04M 1/7253; G10L 19/173; H04H 60/80; H04L 29/08306; H04L 12/2805; H04L 12/1813; H04N 21/8113; H04N 21/4227; H04N 21/43615; H04N 21/4396; H04N 21/4788; H04N 21/632; H04N 21/4126; H04N 21/6181; H04N 21/6187; G08C 17/02; H04W 88/02; G11B 27/00
USPC .............................. 455/556.1, 420, 462, 465
See application file for complete search history.

(56) References Cited

U.S. PATENT DOCUMENTS

| | | | | |
|---|---|---|---|---|
| 8,706,162 | B1* | 4/2014 | Abrahamsson | H04M 1/605 455/556.1 |
| 8,892,164 | B2* | 11/2014 | Sherman | H04W 76/10 455/556.1 |
| 2002/0001381 | A1* | 1/2002 | Mori | H04M 1/6058 379/387.01 |
| 2004/0235520 | A1* | 11/2004 | Cadiz | H04M 1/2473 455/557 |
| 2005/0054379 | A1* | 3/2005 | Cao | H04M 1/72558 455/556.1 |
| 2007/0211579 | A1* | 9/2007 | Yoshimura | H04R 5/04 369/7 |
| 2007/0249295 | A1* | 10/2007 | Ukita | H04M 1/6066 455/88 |
| 2007/0286432 | A1* | 12/2007 | Shin | H04R 3/00 381/77 |
| 2008/0075295 | A1* | 3/2008 | Mayman | G06F 1/1632 381/79 |
| 2008/0157998 | A1* | 7/2008 | Zuo | H04M 1/2535 340/4.37 |
| 2012/0066643 | A1* | 3/2012 | McRae | H04N 21/4126 715/810 |
| 2013/0022038 | A1* | 1/2013 | Cadiz | H04M 1/2473 370/352 |
| 2016/0165031 | A1* | 6/2016 | Gopinath | H04M 1/6091 455/569.2 |

FOREIGN PATENT DOCUMENTS

| | | |
|---|---|---|
| JP | 10-308976 A | 11/1998 |
| JP | 2000-209363 A | 7/2000 |
| JP | 2000-253448 A | 9/2000 |
| JP | 2006-005617 A | 1/2006 |
| JP | 2006-025020 A | 1/2006 |
| JP | 2007-336511 A | 12/2007 |

OTHER PUBLICATIONS

International Search Report dated Feb. 24, 2015, for corresponding International Application No. PCT/JP2014/006128, 4 pages.

* cited by examiner

US 10,257,338 B2

METHOD AND APPARATUS TO CONTROL A STATE OF MUSIC REPRODUCING DEVICE THROUGH WIRELESS COMMUNICATOR

BACKGROUND

1. Technical Field

The present invention relates to a telephone apparatus, a telephone system, and a control method.

2. Description of the Related Art

In recent years, portable music players having a function of reproducing various pieces of music have become widespread, and it is possible to enjoy musical pieces of the music player with a large sound volume by connecting a dedicated external speaker to the music player. The portable music players may include a portable telephone terminal (for example, a smart phone or a portable telephone terminal) which is equipped with a function of a music player, in addition to a dedicated music player.

Japanese Patent Unexamined Publication No. 2007-336511 discloses a technique of connecting a portable music player and a dedicated external speaker unit to each other through a wireless receiving pack, as a related art pertaining to a portable music player.

In many cases, a telephone apparatus capable of being connected to a fixed telephone line is installed in a general house or office. Related arts pertaining to a telephone apparatus are disclosed in Japanese Patent Unexamined Publication No. 2000-253448 and Japanese Patent Unexamined Publication No. 2006-025020.

Japanese Patent Unexamined Publication No. 2000-253448 discloses a cordless telephone system that switches a communication mode of a mobile phone to a public mode or a private mode using a technique of a Personal Handy-Phone System (PHS). The cordless telephone system can use one portable terminal as a mobile phone outdoors and as a slave device of a cordless telephone set indoors.

Japanese Patent Unexamined Publication No. 2006-025020 discloses a telephone system that connects a wireless IP telephone terminal to a master device including a telephone network control circuit and a digital wireless communicator and uses the wireless IP telephone terminal as an internet wireless telephone. The telephone network control circuit is equivalent to a fixed telephone network communicator. The digital wireless communicator is equivalent to a wireless LAN communicator. The wireless IP telephone terminal is equivalent to a slave device.

SUMMARY

A telephone apparatus according to an exemplary embodiment of the invention is a telephone apparatus that is connected to a telephone line and handles outgoing and incoming of a call through the telephone line. The telephone apparatus includes a first wireless communicator that performs wireless communication of data with a music reproducing device, a first controller that manages a state of the music reproducing device through the first wireless communicator and transmits remote control information for remotely controlling the music reproducing device to the music reproducing device, a speaker that outputs sound data as a sound, a sound processor that reproduces sound data received from the music reproducing device and outputs the sound data to the speaker, and a call controller that detects outgoing or incoming of a call through the telephone line and restricts output of sound data from the music reproducing device in a case where the outgoing or incoming of a call is detected while the sound data is output as a sound through the speaker.

A telephone system according to another exemplary embodiment of the invention is a telephone system including a telephone apparatus and a music reproducing device. The telephone apparatus includes a first wireless communicator that performs wireless communication of data with the music reproducing device, a first controller that manages a state of the music reproducing device and remotely controls the music reproducing device through the first wireless communicator, a speaker that outputs sound data as a sound, a sound processor that reproduces sound data from the music reproducing device received by the first wireless communicator and outputs the sound data to the speaker, and a call controller that detects outgoing or incoming of a call through a telephone line and restricts output of sound data from the music reproducing device in a case where the outgoing or incoming of a call is detected while the sound data is output as a sound by the speaker. The music reproducing device includes a third wireless communicator that performs wireless communication of data with the telephone apparatus, a sound data reproducer that reproduces sound data, a sound data transmitter that transmits sound data reproduced by the sound data reproducer to the telephone apparatus as a sound stream, and a third controller that restricts an operation of the music reproducing device in accordance with remote control information received from the telephone apparatus.

A control method according to another exemplary embodiment of the invention is a control method in a telephone apparatus. The control method includes performing wireless communication of data with a music reproducing device, managing a state of the music reproducing device and remotely controlling the music reproducing device through wireless communication, reproducing sound data received from the music reproducing device and outputting the sound data to a speaker, detecting outgoing or incoming of a call through a telephone line, and restricting output of sound data from the music reproducing device in a case where incoming or outgoing of a call is detected while the sound data is output as a sound by the speaker.

DETAILED DESCRIPTION

Hereinafter, an exemplary embodiment of the invention will be described with reference to the accompanying drawings.

Circumstances Leading to Mode of the Invention

In the technique disclosed in Japanese Patent Unexamined Publication No. 2007-336511, a user needs to purchase a dedicated external speaker unit in order to listen to music in a desirable environment, for example, at home. In addition, the external speaker unit only outputs sound, and it is difficult for the external speaker unit to improve, for example, the quality and volume of sound.

In addition, for example, in a case where a portable music player is disposed (docked) on an external speaker unit in order to connect the external speaker unit and the portable music player to each other, the operability of the portable music player is degraded. For example, in a case where a user performs various operations (for example, the adjustment of sound volume, the selection of a musical piece, an operation of starting/stopping reproduction), the user needs to move to the vicinity of the external speaker unit from a position where the user is listening to a sound and to operate the portable music player.

It is preferable to use the telephone apparatuses disclosed in Japanese Patent Unexamined Publication No. 2000-253448 and Japanese Patent Unexamined Publication No. 2006-025020 as the external speaker unit. However, even when the telephone apparatus is simply used as an external speaker unit of a portable music player, the operability of the portable music player in a case of using the external speaker unit does not change.

In addition, it is considered that the outgoing and incoming of a telephone call occur in a telephone apparatus when music reproduced by a portable music player is output from a speaker of the telephone apparatus. In this case, there is the possibility of a reproduced sound of the music in the telephone apparatus interfering with a telephone call.

Hereinafter, a description will be given of a telephone apparatus, a telephone system, and a control method which are capable of improving association between a music reproducing device and a telephone apparatus in a case where sound data is reproduced by the music reproducing device.

EXEMPLARY EMBODIMENT

Figure 1:
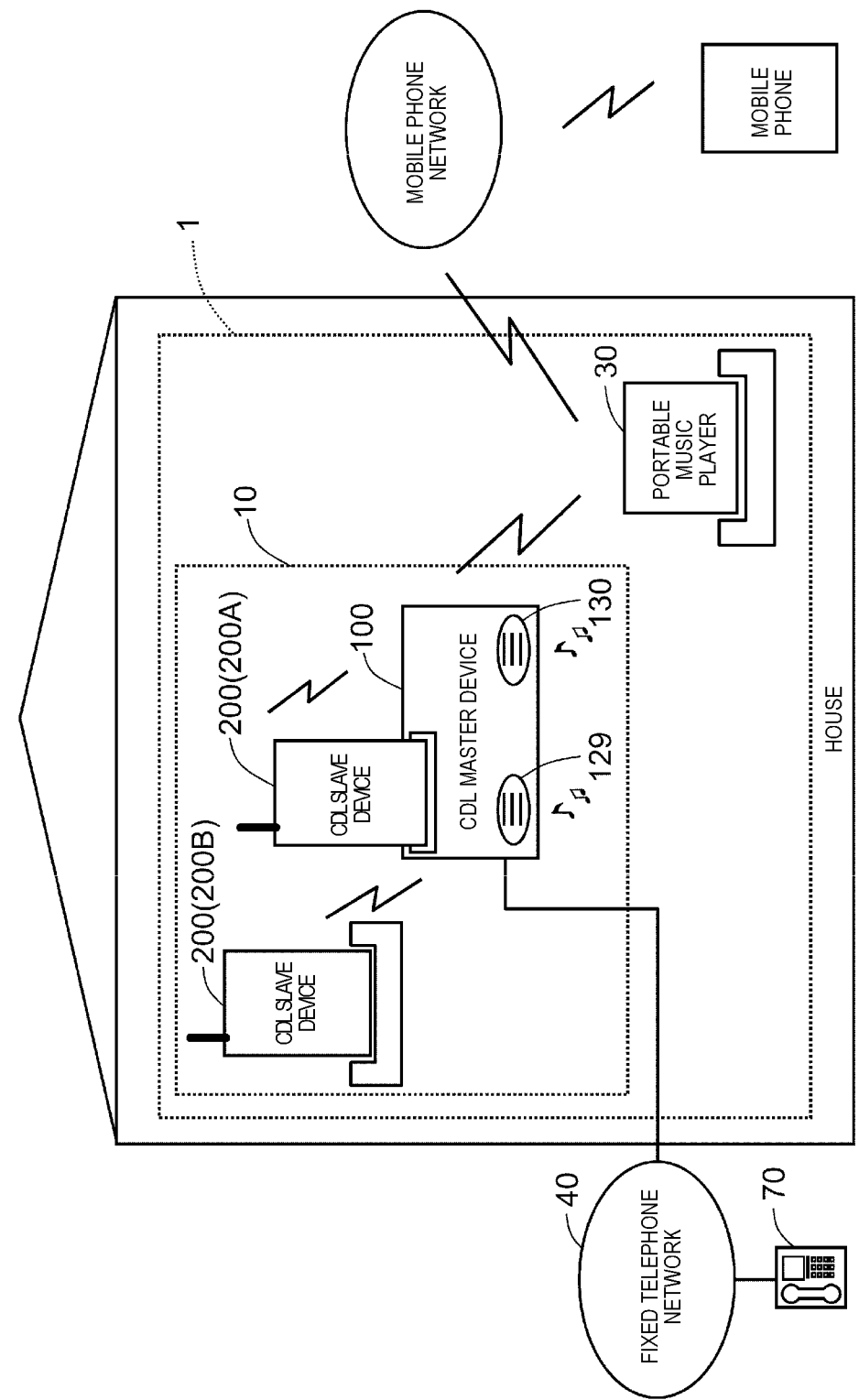
FIG. 1 is a block diagram illustrating a configuration example of a cordless telephone system according to an exemplary embodiment of the invention.

FIG. 1 is a schematic diagram illustrating a configuration example of cordless telephone system 1 including a cordless telephone apparatus according to an exemplary embodiment. Hereinafter, a "cordless telephone" will be briefly referred to as a "CDL".

CDL system 1 includes CDL apparatus 10 and portable music player 30. CDL apparatus 10 includes CDL master device 100 and CDL slave device 200 (200A, 200B). In FIG. 1, CDL apparatus 10 includes two CDL slave devices 200A and 200B, but the number of CDL slave devices may be one or three or more.

CDL master device 100 is connected to a telephone line of fixed telephone network 40. Since CDL master device 100 and CDL slave device 200 are connected to each other in a wireless manner, CDL slave device 200 can be freely moved, for example, in a house.

CDL master device 100 is connected to another telephone apparatus 70 through fixed telephone network 40, and performs various communication (for example, a telephone call). CDL slave device 200 is connected to another telephone apparatus through CDL master device 100 and fixed telephone network 40, and performs various communication (for example, a telephone call).

In CDL apparatus 10, a system used in a known cordless telephone apparatus may be adopted as a system of wireless communication between CDL master device 100 and CDL slave device 200. Examples of the system include a PHS system using a band of 1.9 GHz, a Digital Enhanced Cordless Telecommunication (DECT) system, a Worldwide Digital Cordless Telephone (WDCT) system using a band of 2.4 GHz, and the like.

CDL master device 100 has a function of being associated with portable music player 30. Portable music player 30 includes, for example, a portable terminal exclusively used to reproduce music and a portable terminal in which an application exclusively used to reproduce music is embedded. The portable terminal includes, for example, a portable telephone terminal or a smart phone. A stationary type music player may be used instead of portable music player 30.

A system of wireless communication between CDL master device 100 and portable music player 30 may be a communication system which is used as a short-range wireless communication technique in a house. Examples of the system include an IEEE802.15.1 system (Bluetooth (registered trademark)), an IEEE802.11 system (wireless LAN), or an IEEE802.15.4 system (Zigbee (registered trademark)). With regard to the subsequent wireless communication system between CDL master device 100 and portable music player 30, a description will be given of an example in which the CDL master device and the portable music player are connected to each other in a wireless manner through Bluetooth (registered trademark) and are operated in association with each other.

In a case where portable music player 30 reproduces sound data (audio data), the sound data may be output as a sound from speakers 129 and 130 included in CDL master device 100. In other words, speakers 129 and 130 of CDL master device 100 can be used as external speakers of portable music player 30.

Sound data reproduced by portable music player 30 widely includes, for example, music (musical piece) data, sound data having a conversation recorded therein, data of ambient sound, and data regarding sounds reproducible by other general music players.

In a case where portable music player 30 reproduces sound data, CDL slave device 200 may remotely control portable music player 30 through CDL master device 100. In other words, CDL slave device 200 can be used as a remote controller of portable music player 30.

Next, a configuration example of CDL master device 100 will be described.

Figure 2:
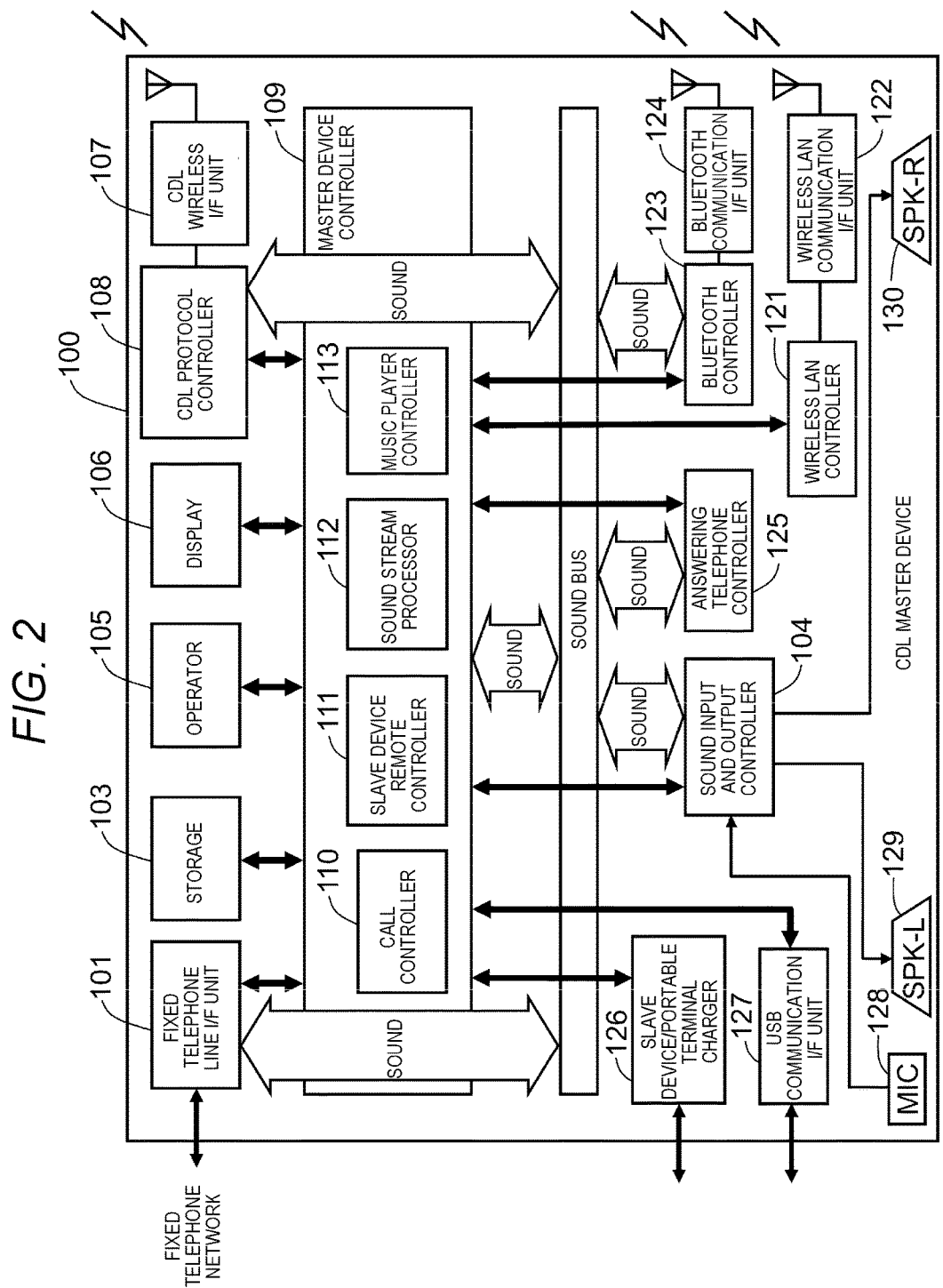
FIG. 2 is a block diagram illustrating a configuration example of a cordless telephone master device according to the exemplary embodiment of the invention.

FIG. 2 is a block diagram illustrating a configuration example of CDL master device 100.

CDL master device 100 includes fixed telephone line I/F (interface) unit 101, storage 103, sound input and output controller 104, operator 105, display 106, CDL wireless I/F unit 107, and CDL protocol controller 108. CDL master device 100 includes master device controller 109, wireless LAN controller 121, wireless LAN communication I/F unit 122, Bluetooth (registered trademark) controller 123, and Bluetooth (registered trademark) communication I/F unit 124. CDL master device 100 includes answering telephone controller 125, slave device/portable terminal charger 126, Universal Serial Bus (USB) communication I/F unit 127, microphone (MIC) 128, and speakers (SPK-L, SPK-R) 129 and 130.

Master device controller 109 includes call controller 110, slave device remote controller 111, sound stream processor 112, and music player controller 113.

Fixed telephone line I/F unit 101 includes a line control circuit (NCU: Network Control Unit) and a modem. The NCU controls a telephone line, and detects, for example, an incoming call from fixed telephone network 40, and captures and connects fixed telephone network 40 during the outgoing of a call. The modem receives, for example, caller number information from fixed telephone network 40 during the incoming of a call. Meanwhile, fixed telephone line I/F unit 101 can be connected to an ISDN line and a digital telephone line such as an IP telephone line depending on the configuration of the line control circuit, without being limited to connection to an analog telephone line.

Storage 103 is configured to include a volatile memory (RAM) and a nonvolatile memory (a ROM, an EPROM, or the like). Storage 103 stores various programs and various information (for example, various parameters for determining operation conditions of CDL apparatus 10, telephone directory information, and outgoing and incoming history information).

Sound input and output controller 104 performs analog conversion on sound data converted into a digital signal from a sound bus, thereby controlling the output to speakers 129 and 130, controlling the output of sound volume according to an instruction from master device controller 109, and controlling the quality of a sound. In addition, the sound input and output controller converts an analog sound received from microphone 128 into a digital sound to thereby control the transmission to a sound bus. Microphone 128 and speakers 129 and 130 are used in a case where hands-free conversation is performed. In addition, sound signals to be output to speakers 129 and 130 include not only a telephone call but also, for example, an incoming tone and sound data acquired from portable music player 30, and the speakers are used to output an incoming tone and are used as external speakers of a portable music player. Meanwhile, a stereo sound or a monaural sound is output from speakers 129 and 130 depending on sound data received by sound input and output controller 104.

Operator 105 includes, for example, a plurality of buttons operable by a user, and receives an operation input. The buttons include, for example, a dial key required to input a number during the outgoing of a call, function keys, such as a reproduction key, a stop key, and a pause key for controlling association with a music player, having various functions allocated thereto, a sound volume adjustment key for adjusting the volume of a sound from a speaker, and soft keys for starting up functions displayed in association with the display position of display 106.

Display 106 is configured to include a liquid crystal display and the driver thereof, and displays various information (for example, a telephone number, information regarding a communication destination or a communication source, and operation guidance information).

CDL wireless I/F unit 107 includes a transmission and reception circuit for performing wireless communication with CDL slave device 200. Although not shown in the drawing, CDL wireless I/F unit 107 performs the transmission and reception of a wireless signal through an antenna by a Radio Frequency (RF) unit.

CDL protocol controller 108, which is a protocol stack unit transmitting and receiving data to and from CDL slave device 200, performs protocol control in accordance with a control protocol (for example, a DECT protocol scheme and a PHS protocol scheme) with respect to CDL slave device 200.

Master device controller 109 is configured to include hardware mainly constituted by, for example, a microcomputer, and various functions of master device controller 109 are realized by executing programs that are previously embedded therein. Master device controller 109 controls the entirety of CDL master device 100.

Call controller 110 processes an event or various messages which are given notice of by operator 105, fixed telephone line I/F unit 101, or CDL protocol controller 108 (CDL slave device 200), and manages the state of a call occurring in CDL master device 100 and performs connection of the call. The management of the state of a call includes, for example, the detection of outgoing or incoming of a call. In addition, call controller 110 controls the output/ stop of an incoming tone, and notifies slave device remote controller 111 or music player controller 113 to be described later of various internal events (the input of a key from a slave device, giving an instruction for remote control to portable music player 30, and the like). Accordingly, for example, when the incoming of a call from fixed telephone network 40 is detected, the call controller performs control of stopping the output of sound data received from portable music player 30 to speaker 129 and outputting an incoming tone.

Slave device remote controller 111 performs control so that CDL slave device 200 operates as an operator for remotely operating portable music player 30. For example, when CDL slave device 200 operates as a remote controller of portable music player 30, slave device remote controller 111 edits information of a remote control screen assisting a remote control operation and transmits the edited information to CDL slave device 200. The information of the remote control screen is generated on the basis of, for example, a correspondence relation between a process for which an instruction is given to portable music player 30 by a remote operation and keys in operator 144 of CDL slave device 200 for executing the process.

Slave device remote controller 111 acquires information regarding a key from CDL slave device 200, which is received through CDL wireless I/F unit 107, through call controller 110, acquires information regarding a remote control operation (for example, reproduction, stop, and pause) of portable music player 30 which is associated with a key in remote control screen information being displayed, and notifies music player controller 113 of remote control information corresponding to the remote control operation. In addition, when a key operation of CDL slave device 200 is a key operation for increasing or decreasing sound volume, slave device remote controller 111 gives an instruction for increasing or decreasing sound volume to sound input and output controller 104.

Sound stream processor 112 controls a connection procedure for sound stream communication from portable music player 30, and forms a sound path from Bluetooth (registered trademark) controller 123 to sound input and output controller 104 in order to output sound stream data, which is transmitted from portable music player 30, to speakers 129 and 130. Meanwhile, the sound path from Bluetooth (registered trademark) controller 123 to sound input and output controller 104 may be formed between Bluetooth (registered trademark) controller 123 and sound input and output controller 104 by buffering performed by sound stream processor 112, or a sound path may be formed from Bluetooth (registered trademark) controller 123 to sound input and output controller 104 so as to pass through a sound bus instead of passing through sound stream processor 112.

In addition, in a case where sound stream data is received through wireless LAN communication IT unit 122, first, sound stream processor 112 buffers sound stream data, and a sound path to sound input and output controller 104 is formed through a sound bus.

In the connection procedure for sound stream communication, an Advanced Audio Distribution Profile (A2DP) is generally used in a case of Bluetooth (registered trademark), but another protocol for sound streaming such as a Real Time Streaming Protocol (RTSP) may be adopted.

Music player controller 113 manages the state of portable music player 30, and remotely controls portable music player 30. For example, music player controller 113 transmits remote control information (for example, reproduction, stop, and pause) for remotely operating portable music player 30 to portable music player 30 through a wireless line.

For example, the remote control information may be generated in accordance with information which is operated and input through operator 105 of CDL master device 100, or may be generated in accordance with information which is operated and input through operator 144 of CDL slave device 200.

Meanwhile, in a communication procedure for remotely controlling portable music player 30 from CDL master device 100, apparatuses may perform communication therebetween by independently deciding on a control message, but communication can be performed using an Audio/Video Remote Control Profile (AVRCP) in a case of communication between Bluetooth (registered trademark) devices.

Wireless LAN controller 121 and wireless LAN communication I/F unit 122 communicate data with each other by being connected to an external wireless LAN device in accordance with IEEE802.11, that is, a wireless LAN standard.

Bluetooth (registered trademark) communication I/F unit 124 is an RF unit that transmits and receives a wireless signal having a Bluetooth (registered trademark) standard through an antenna, and Bluetooth (registered trademark) controller 123 instructs the RF unit to perform control, performs baseband control such as communication link control or packet control, and converts sound stream data received from portable music player 30 into a sound bus format (for example, a PCM format) within CDL master device 100.

Bluetooth (registered trademark) communication I/F unit 124 is connected in a wireless manner by Bluetooth (registered trademark) in order to perform wireless communication between CDL master device 100 and portable music player 30.

Answering telephone controller 125 stores, for example, an answering telephone message, and controls the recording and reproduction of the message.

Slave device/portable terminal charger 126 charges a rechargeable battery mounted to, for example, CDL slave device 200, portable music player 30, or other portable terminals. Slave device/portable terminal charger 126 may perform charging by including a docking portion on which a terminal to be charged is to be disposed, and a charging terminal, or may perform wireless power supply by serving as a charging unit corresponding to a Qi standard which is a standard of wireless power supply.

USB communication I/F unit 127 is a communication interface for connecting various devices (for example, portable music player 30) corresponding to a USB standard to CDL master device 100. USB communication I/F unit 127 may operate as a power supply unit that supplies power to, for example, CDL slave device 200 or portable music player 30.

In FIG. 2, two speakers 129 and 130 are illustrated as stereo type speakers, but one monaural type speaker may be used.

Next, a configuration example of CDL slave device 200 will be described.

Figure 3:
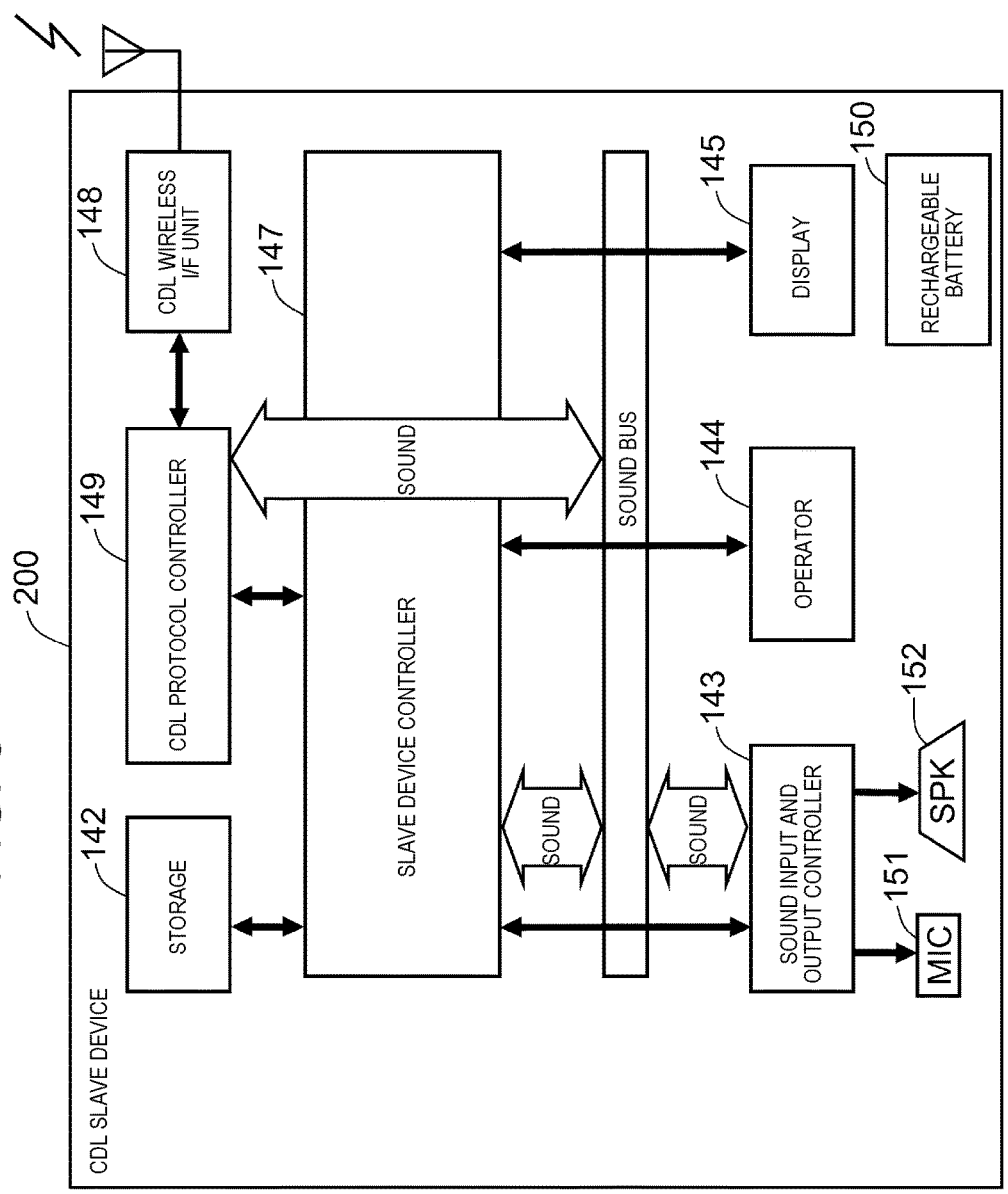
FIG. 3 is a block diagram illustrating a configuration example of a cordless telephone slave device according to the exemplary embodiment of the invention.

FIG. 3 is a block diagram illustrating a configuration example of CDL slave device 200.

CDL slave device 200 includes storage 142, sound input and output controller 143, operator 144, display 145, slave device controller 147, CDL wireless I/F unit 148, CDL protocol controller 149, rechargeable battery 150, microphone (MIC) 151, and speaker (SPK) 152.

Storage 142 is configured to include a volatile memory (RAM) and a nonvolatile memory (a ROM, an EPROM, or the like). Storage 142 stores various programs and various pieces of information (for example, telephone directory information, and outgoing and incoming history information).

Sound input and output controller 143 performs control for making microphone 151 and speaker 152 input or output a sound signal. Examples of the sound signal which is output to speaker 152 include an incoming tone, a telephone call sound, an answering telephone message, and the like.

Operator 144 includes, for example, a plurality of buttons operable by a user, and receives an operation input. The buttons include, for example, a dial key required to input a number during the outgoing of a call, function keys having various functions allocated thereto, soft keys for starting up functions displayed in association with the display position of display 145, and arrow keys for selecting upward, downward, rightward, and leftward directions. Operator 144 may be, for example, a touch panel superimposed on display 145.

Display 145 is configured to include a liquid crystal display and the driver thereof, and displays various information (for example, a telephone number, information regarding a communication destination or a communication source, and operation guidance information). In addition, in a case where display 145 operates as a remote controller of portable music player 30, the display displays a remote control screen.

Slave device controller 147 is configured to include hardware mainly constituted by, for example, a microcomputer, and various functions of slave device controller 147 are realized by executing programs that are previously embedded therein. Slave device controller 147 controls the entirety of CDL slave device 200.

CDL wireless I/F unit 148 includes a transmission and reception circuit for performing wireless communication with CDL master device 100. Although not shown in the drawing, CDL wireless I/F unit 148 performs the transmission and reception of a wireless signal through an antenna by an RF unit.

CDL protocol controller 149, which is a protocol stack unit transmitting and receiving data to and from CDL master device 100, performs protocol control in accordance with a control protocol (for example, a DECT protocol scheme, a PHS protocol scheme, a WDCT scheme, or the like) with respect to CDL master device 100.

Rechargeable battery 150 supplies power of a power supply to each unit of CDL slave device 200. For example, CDL slave device 200 is disposed on slave device/portable terminal charger 126 of CDL master device 100, and thus rechargeable battery 150 is charged.

Next, a configuration example of portable music player 30 will be described.

Although a configuration of portable music player 30 is not particularly illustrated, the portable music player has a configuration of a general music player. Portable music player 30 includes, for example, a wireless communicator, a controller, a storage, a music reproduction application unit, an operator, a display, and a sound output. The wireless communicator performs wireless connection to a cordless telephone master device through short-range wireless communication such as Bluetooth (registered trademark). The controller controls the entirety of portable music player 30. The storage stores various pieces of data including music data. The music reproduction application unit, which is an example of a sound data reproducer and a sound data transmitter, reproduces music data by software operating in a controller, and has a stream transmission function and a remote control function. The sound output includes a speaker and an earphone jack. In addition, it is needless to say that a mobile phone or a smart phone including the above-mentioned components is a mode of a portable music player.

Sound data reproduced by portable music player 30 may be stored in the storage of portable music player 30, may be acquired from, for example, an external server using a wireless communication function, or may be acquired from an external storage device (for example, a memory card, a USB memory, or the like).

Next, an operation example during a remote control operation of CDL system 1 will be described. The remote control operation includes making CDL slave device 200 operate as a remote controller for remotely controlling portable music player 30.

Figure 4:
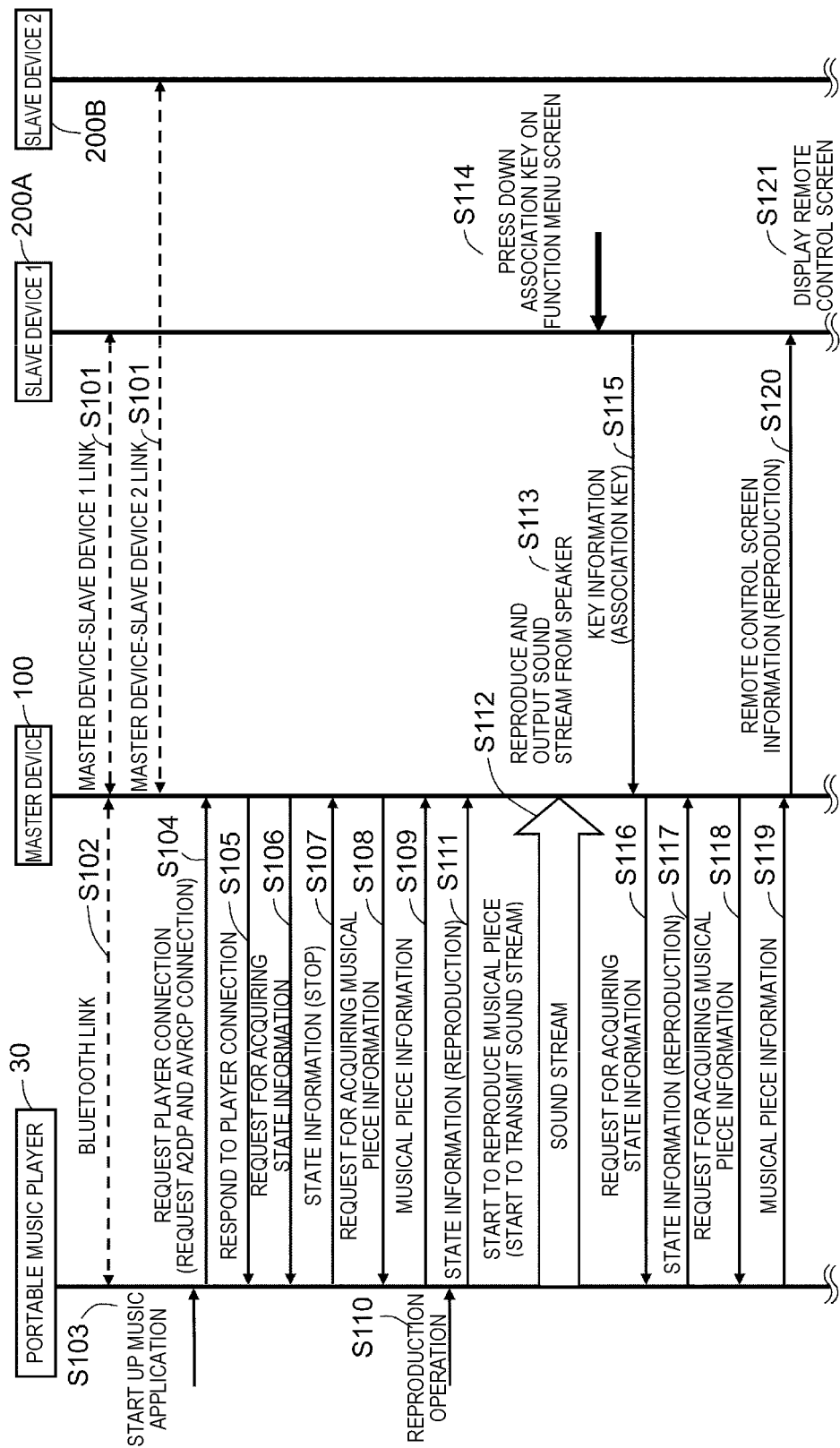
FIG. 4 is a sequence diagram illustrating a first operation example during a remote control operation in a case where a cordless telephone apparatus and a portable music player are associated with each other, according to the exemplary embodiment of the invention.
Figure 5:
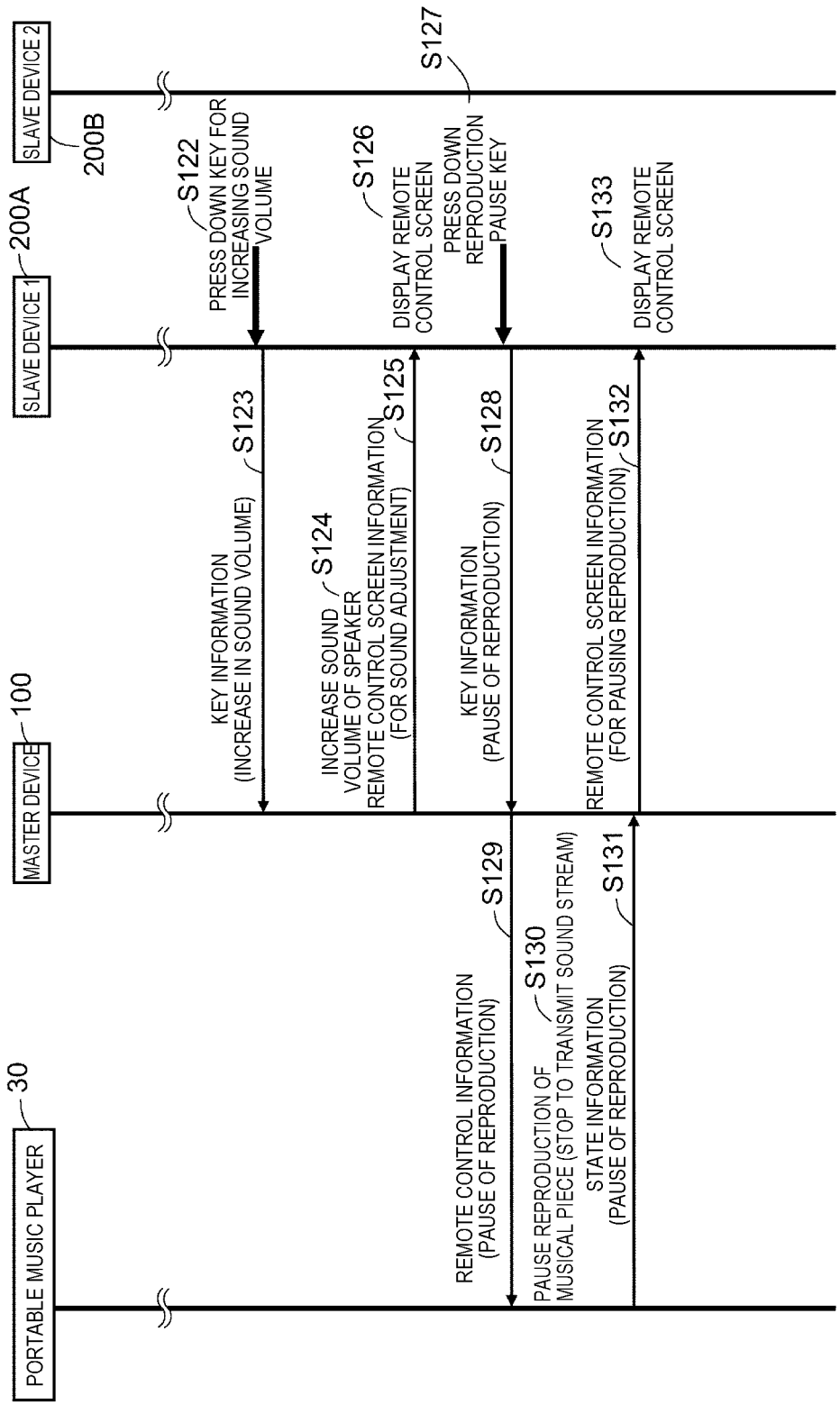
FIG. 5 is a sequence diagram illustrating the first operation example during a remote control operation in a case where the cordless telephone apparatus and the portable music player are associated with each other, according to the exemplary embodiment of the invention (continuation of FIG. 4)

In CDL system 1, CDL apparatus 10 and portable music player 30 operate in association with each other. FIGS. 4 and 5 are sequence diagrams illustrating a first operation example during a remote control operation in a case where CDL master device 100, CDL slave device 200, and portable music player 30 are associated with each other. In FIGS. 4 and 5, it is assumed that CDL slave device 200A mainly operates as a remote controller.

First, CDL protocol controller 108 of CDL master device 100 and CDL protocol controller 149 of CDL slave device 200 form a link of wireless communication (for example, DECT) between CDL master device 100 and CDL slave devices 200A and 200B, and are set to be in a standby state while establishing a communication link between a cordless telephone master device and a slave device (S101).

Bluetooth (registered trademark) controller 123 of CDL master device 100 and portable music player 30 form a link of Bluetooth (registered trademark) between CDL master device 100 and portable music player 30, and are paired (S102). Hereinafter, a description will be given of an association operation performed between portable music player 30 and CDL master device 100 using an A2DP and an AVRCP which are Bluetooth (registered trademark) profiles.

The A2DP is a type of Bluetooth (registered trademark) profile which is a communication protocol defined for each type of Bluetooth (registered trademark) device, and defines a procedure for performing the streaming distribution of sound data (performing reproduction while receiving sound data). In this exemplary embodiment, portable music player 30 serves as a streaming distribution side (SRC), and CDL master device 100 serves as a streaming reception side (SNK).

In addition, the AVRCP is adopted for remote control such as in a wireless earphone corresponding to Bluetooth (registered trademark), and is a Bluetooth (registered trademark) profile which is used to remotely control a main body (music player or the like) from a remote controller.

Portable music player 30 and CDL master device 100 operate in accordance with the procedure of the A2DP, and thus sound data can be transmitted from portable music player 30 to CDL master device 100. CDL master device 100 can reproduce sound data while receiving the sound data.

Examples of a format of sound data subjected to streaming distribution include formats of SubBand Codec (SBC), Moving Picture Experts Group (MPEG) Audio Layer-3 (MP3), Advanced Audio Coding (AAC), and Adaptive Transform Acoustic Coding (ATRAC).

Subsequently, for example, a user operates portable music player 30, and portable music player 30 starts up an application for reproducing music (S103). When portable music player 30 starts up a music application, portable music player 30 requests CDL master device 100 to perform player connection for requesting sound stream distribution connection and remote control connection (S104). In the player connection, sound stream distribution using, for example, an A2DP and an AVRCP and a connection requesting procedure for remote control are performed.

In CDL master device 100, music player controller 113 receives a request for player connection from portable music player 30 through Bluetooth (registered trademark) communication I/F unit 124. Music player controller 113 transmits a player connection response (for example, an ACK signal) to the request for player connection to portable music player 30 through Bluetooth (registered trademark) communication I/F unit 124 (S105). Thereby, it is possible to establish A2DP connection and AVRCP connection.

Subsequently, music player controller 113 transmits a request for acquiring AVRCP state information to portable music player 30 through Bluetooth (registered trademark) communication I/F unit 124 (S106). The state information includes information regarding the state (for example, reproduction, stop, and pause) of portable music player 30.

Portable music player 30 receives the request for acquiring state information from CDL master device 100. Portable music player 30 transmits the state information (for example, "stop") to CDL master device 100 in accordance with the request for acquiring state information (S107). In CDL master device 100, when music player controller 113 receives the state information from portable music player 30 through Bluetooth (registered trademark) communication I/F unit 124, the music player controller stores the information in storage 103.

Subsequently, in CDL master device 100, music player controller 113 transmits a request for acquiring AVRCP musical piece information to portable music player 30 through Bluetooth (registered trademark) communication I/F unit 124 (S108). The musical piece information is information regarding sound data, and includes, for example, an album name, an artist name, a title name, and a track number. Here, the musical piece information includes, for example, musical piece information regarding sound data which is included in portable music player 30 or which is capable of being referred to by the portable music player.

Portable music player 30 receives the request for acquiring musical piece information from CDL master device 100. Portable music player 30 transmits the musical piece information regarding sound data which is included in portable music player 30 or which is capable of being referred to by the portable music player to CDL master device 100 in accordance with the request for acquiring musical piece information (S109). In CDL master device 100, when music player controller 113 receives the musical piece information from portable music player 30 through Bluetooth (registered trademark) communication I/F unit 124, the music player controller stores the information. The musical piece information may be timely transmitted to CDL master device 100 from portable music player 30.

Meanwhile, when the state (for example, reproduction, stop, and pause) of portable music player 30 changes due to a user's operation of portable music player 30 or a remote operation from CDL master device 100, portable music player 30 transmits state information indicating the change in state to CDL master device 100. In addition, the musical piece information and the state information are used when necessary, and are displayed on display 106 or display 145 of CDL slave device 200, for example, at a predetermined timing.

For example, the start of reproduction of sound data in portable music player 30 may be instructed by a user directly operating portable music player 30, or may be instructed by operating CDL slave device 200 functioning as a remote controller of portable music player 30. In FIG. 4, a user operates an operator of portable music player 30 after the start-up of a music application to thereby perform an operation of reproducing a musical piece which is selected (S110).

Thereby, portable music player 30 changes from a stopped state to a reproducing state, and thus AVRCP state information (reproduction) indicating a reproducing state is transmitted from portable music player 30 to music player controller 113 of CDL master device 100, and music player controller 113 updates the state of portable music player 30 to a reproducing state (S111).

Subsequently, portable music player 30 starts to sequentially transmit sound streams to CDL master device 100 through an A2DP using sound data which is included in portable music player 30 or which is capable of being referred to by the portable music player as, for example, sound stream data (S112).

In CDL master device 100, when the transmission of sound streams from portable music player 30 is started, Bluetooth (registered trademark) controller 123 notifies sound stream processor 112 that the transmission of sound streams has been started, through Bluetooth (registered trademark) communication IT unit 124.

The sound stream processor which is notified of the start of transmission of sound streams forms a sound path from Bluetooth (registered trademark) controller 123 to sound input and output controller 104 in order to output the sound stream data received from portable music player 30 to speakers 129 and 130.

Thereby, the sound stream data transmitted from portable music player 30 is converted into a sound bus format (PCM data) within a master device by Bluetooth (registered trademark) controller 123, and is then input to sound input and output controller 104 through a sound bus.

The sound input and output controller converts the sound data (PCM data) which is input through the sound bus into an analog signal, and outputs a sound from speakers 129 and 130 (S113).

Therefore, in a case where portable music player 30 reproduces the sound data, speakers 129 and 130 of CDL master device 100 are used as external speakers of portable music player 30.

In CDL slave device 200A, a user presses down a function key (for example, an association key) for association with portable music player 30 while display 145 displays a predetermined function menu screen, and operator 144 detects the pressing-down of the association key (S114). When the association key is pressed down, CDL slave device 200A notifies CDL master device 100 of a key information message (association key) indicating a request for starting association with portable music player 30 (S115).

Meanwhile, in the above description, an operation as a remote controller of portable music player 30 is started by an operation of pressing down a dedicated function key for association with portable music player 30, but an operation as a remote controller may be started by selecting a music player association function from functions displayed on a function menu screen of CDL slave device 200A and performing a series of key operations for starting up a remote control operation.

In CDL master device 100, when CDL wireless I/F unit 107 receives the key information message (association key) from CDL slave device 200A, the key information message (association key) is transmitted to call controller 110, and call controller 110 detects that the received key information indicates an association key.

Call controller 110 notifies music player controller 113 that the association key has been detected. Music player controller 113 transmits a request for acquiring AVRCP state information to portable music player 30 through Bluetooth (registered trademark) communication I/F unit 124 (S116).

When portable music player 30 receives the request for acquiring state information from CDL master device 100, state information (for example, "reproduction") indicating the current state of portable music player 30 is transmitted to CDL master device 100 (S117).

Subsequently, in CDL master device 100, music player controller 113 transmits a request for acquiring AVRCP musical piece information to portable music player 30 through Bluetooth (registered trademark) communication I/F unit 124 (S118).

When portable music player 30 receives the request for acquiring musical piece information from CDL master device 100, musical piece information regarding sound data which is included in portable music player 30 or which is capable of being referred to by the portable music player is transmitted to CDL master device 100 (S119).

In addition, when call controller 110 detects that key information indicates an association key, the call controller updates the state of CDL slave device 200A to a slave device remote control operation state and notifies slave device remote controller 111 of the start-up of remote control of the slave device.

When slave device remote controller 111 is notified of the start-up of remote control of the slave device, the slave device remote controller generates remote control screen information and transmits the remote control screen information to CDL slave device 200A (S120). The remote control screen information includes, for example, musical piece information or state information received from portable music player 30. For example, when CDL slave device 200A operates as a remote controller of portable music player 30, the remote control screen information may include information indicating functions allocated to keys of CDL slave device 200A and information indicating various parameters or control conditions for making CDL slave device 200A operate as a remote controller.

In CDL slave device 200A, CDL wireless I/F unit 148 receives remote control screen information indicating a music player reproduction state from CDL master device 100, and display 145 displays a remote control screen (for example, see FIG. 7A to be described later) (S121). A user of CDL slave device 200A can confirm contents displayed on the remote control screen of CDL slave device 200A through the remote control screen displayed to thereby input an operation for remotely operating portable music player 30. Therefore, when portable music player 30 and CDL master device 100 are associated with each other, it is possible to remotely operate portable music player 30 by the operation of CDL slave device 200A.

Examples of processes to be subjected to a remote operation include reproduction (PLAY), the pause of reproduction (PAUSE), the stop of reproduction (STOP), fast forwarding/reproduction of the next piece of music, rewinding/reproduction of the previous piece of music, the increasing of sound volume, and the decreasing of sound volume.

After S121 of FIG. 4, the process proceeds to S122 of FIG. 5.

In CDL slave device 200A, when operator 144 detects a key input operation for increasing sound volume (S122), CDL wireless I/F unit 148 transmits a key information (increase in sound volume) message to CDL master device 100 (S123).

In this case, in CDL master device 100, CDL wireless I/F unit 107 receives the key information (increase in sound volume) message and transmits the message to call controller 110.

When call controller 110 confirms that CDL slave device 200A is in a slave device remote control operation state, the call controller notifies slave device remote controller 111 of the key information (increase in sound volume).

Slave device remote controller 111 instructs sound input and output controller 104 to increase the sound volume of an output through speakers 129 and 130 (S124).

At this time, slave device remote controller 111 may generate remote control screen information for adjusting sound volume, and may transmit the generated remote control screen information to CDL slave device 200A (S125).

In CDL slave device 200A, CDL wireless I/F unit 148 receives the generated remote control screen information for adjusting sound volume from CDL master device 100, and display 145 displays a remote control screen (for example, see FIG. 7B to be described later) (S126).

In CDL slave device 200A, when operator 144 detects the input of an operation of pausing reproduction (S127), CDL wireless I/F unit 148 transmits a key information (pause of reproduction) message to CDL master device 100 (S128).

In this case, in CDL master device 100, CDL wireless I/F unit 107 receives the key information (pause of reproduction) message and transmits the received message to call controller 110.

When call controller 110 confirms that CDL slave device 200A is in a slave device remote control operation state, the call controller notifies slave device remote controller 111 of the key information (pause of reproduction).

When slave device remote controller 111 receives the key information (pause of reproduction) message, the slave device remote controller instructs music player controller 113 to pause reproduction in order to instruct music player controller 113 to perform a remote control operation for pausing reproduction.

When music player controller 113 receives an instruction for pausing reproduction from slave device remote controller 111, the music player controller transmits AVRCP remote control information (pause of reproduction) to portable music player 30 in a wireless manner through Bluetooth (registered trademark) controller 123 (S129). The remote control information includes information for instructing the pause of reproduction by portable music player 30.

When portable music player 30 receives the remote control information (pause of reproduction) for instructing the pause of reproduction from CDL master device 100, the portable music player pauses the reproduction of sound data to be reproduced, stops transmitting sound stream data to CDL master device 100 (S130), and notifies CDL master device 100 of state information (pause of reproduction) indicating a reproduction pause state (S131).

In CDL master device 100, when music player controller 113 receives the state information indicating the pause of reproduction, the music player controller updates the state of portable music player 30 to a reproduction pause state and notifies slave device remote controller 111 of the change in state. Slave device remote controller 111 generates a remote control screen for pausing reproduction, and transmits the remote control screen for pausing reproduction to CDL slave device 200A during a remote control operation (S132).

In CDL slave device 200A, CDL wireless I/F unit 148 receives the remote control screen for pausing reproduction information from CDL master device 100, and display 145 displays a remote control screen (for example, see FIG. 7C to be described later) (S133).

As described above, according to the first operation example during a remote control operation, in a case where portable music player 30 reproduces sound data, speakers 129 and 130 of CDL master device 100 can be used as external speakers. In addition, CDL slave device 200 can be used as a remote controller that remotely operates portable music player 30.

In addition, in a case where a user performs various operations on portable music player 30 by operating CDL slave device 200 as a remote controller, the user does not need to move, and thus it is possible to increase the degree of freedom of the user's viewing environment. The term "viewing" as used herein includes listening to only sound data without being accompanied by image data.

Furthermore, in the above, a description has been given of an example in which portable music player 30 is remotely operated by operating a slave device from CDL slave device 200A. When a key (association key) for association with portable music player 30 is pressed in another CDL slave device 200B in a state where CDL slave device 200A starts up a remote control operation, it is possible to remotely operate portable music player 30 in common with CDL slave device 200A even by an operation from CDL slave device 200B.

Figure 6:
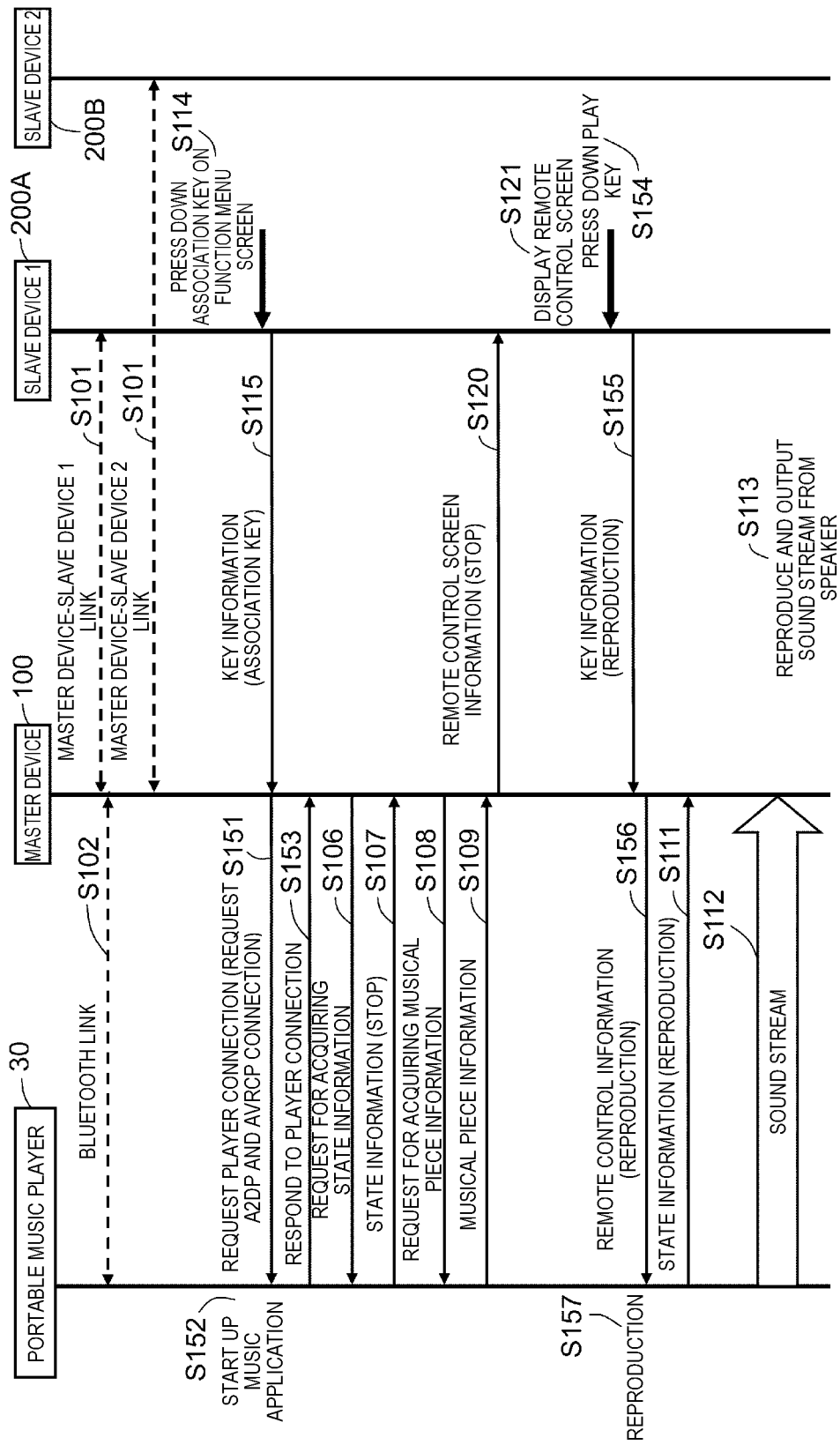
FIG. 6 is a sequence diagram illustrating a second operation example during a remote control operation in a case where the cordless telephone apparatus and the portable music player are associated with each other, according to the exemplary embodiment of the invention.

FIG. 6 is a sequence diagram illustrating a second operation example during a remote control operation in a case where CDL master device 100, CDL slave device 200, and portable music player 30 are associated with each other. In FIG. 6, it is assumed that CDL slave device 200A is mainly operated as a remote controller. In FIG. 6, steps different from the steps in FIGS. 4 and 5 will be described, and the same steps as the steps in FIGS. 4 and 5 will be denoted by the same reference numerals and signs, and a description thereof will be omitted or simplified.

First, the processes of S101 and S102 are performed. Subsequently, processes of S114 and S115 are performed.

In CDL master device 100, when call controller 110 receives an association start request from CDL slave device 200A through CDL wireless I/F unit 107, the call controller notifies music player controller 113 of the reception of the association start request. Music player controller 113 confirms a player connection state (an A2DP connection state and an AVRCP connection state) with respect to portable music player 30. In a case of a disconnection state, the music player controller requests player connection for starting A2DP connection and AVRCP connection from portable music player 30 through Bluetooth (registered trademark) communication IT unit 124 (S151).

The formation of a link of Bluetooth (registered trademark) communication in S102 may be performed at a timing when the association start request is received from CDL slave device 200A by music player controller 113. That is, the process of S102 may be performed at a timing between S115 and S151.

When portable music player 30 receives a request for player connection from CDL master device 100, the portable music player starts up a music application (S152). Portable music player 30 transmits a player connection response (for example, an ACK signal) to the request for player connection to CDL master device 100 (S153).

In this manner, it is possible to make portable music player 30 start up a music application from a CDL master device 100 side by an operation from CDL slave device 200 and to establish A2DP connection and AVRCP connection. Meanwhile, the start-up of the music application may be instructed by a user through an operator of portable music player 30, for example, after a request for player connection is received.

Subsequently, the processes of S106 to S109 are performed. Subsequently, the processes of S120 and S121 are performed.

In CDL slave device 200A, in a case where a user performs an operation using, for example, a remote control screen and operator 144 detects the input of a reproduction (PLAY) operation (S154), CDL wireless I/F unit 148 transmits a key information (reproduction) message to CDL master device 100 (S155).

In this case, in CDL master device 100, call controller 110 receives the key information (reproduction) message through CDL wireless I/F unit 107, and music player controller 113 transmits AVRCP remote control information (reproduction) to portable music player 30 in a wireless manner through Bluetooth (registered trademark) controller 123 (S156).

When portable music player 30 receives remote control information (reproduction) for instructing a reproduction operation from CDL master device 100, the portable music player starts to reproduce sound data to be reproduced (S157).

Subsequently, the processes of S111 to S113 are performed.

According to the second operation example during a remote control operation, the same effects as those in the first operation example are obtained. Furthermore, for example, even in a case where a music application is not started up by portable music player 30 or a case where portable music player 30 and CDL master device 100 are not associated with each other, CDL slave device 200 can initiatively instruct the start-up of the music application. After the start-up of the music application, CDL slave device 200 can be operated as a remote controller that instructs various operations with respect to the music application of portable music player 30.

Next, a screen example of a remote control screen displayed on display 145 of CDL slave device 200 will be described.

Figure 7A:
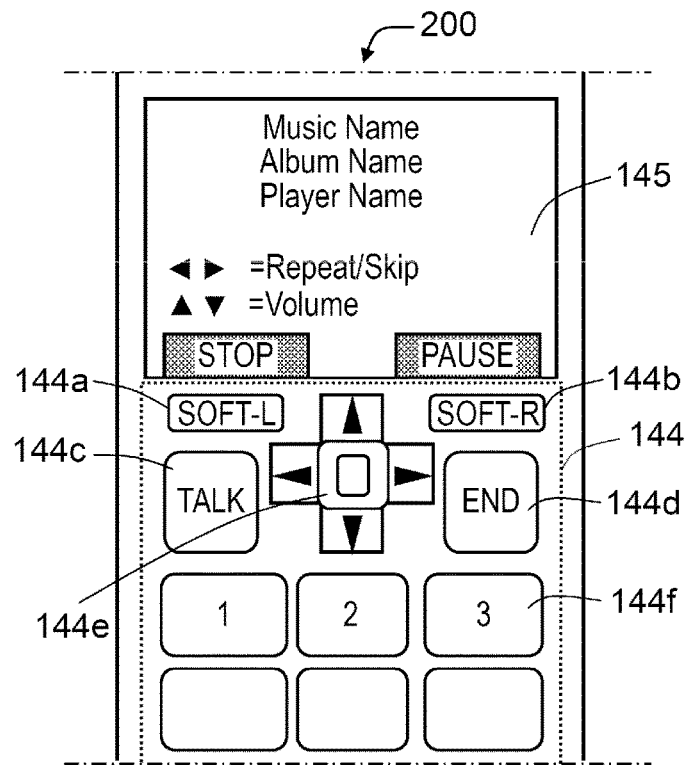
FIG. 7A is a schematic diagram illustrating an example of a relationship between state changes and screen transition in a cordless telephone slave device according to the exemplary embodiment of the invention.
Figure 7B:
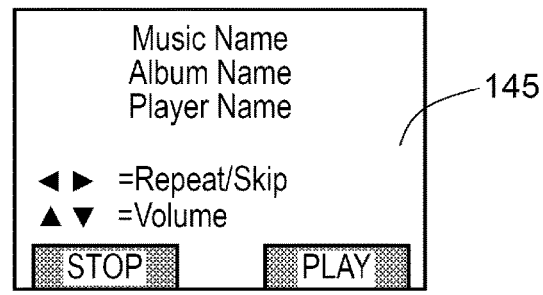
FIG. 7B is a schematic diagram illustrating an example of a relationship between state changes and screen transition in the cordless telephone slave device according to the exemplary embodiment of the invention.
Figure 7C:
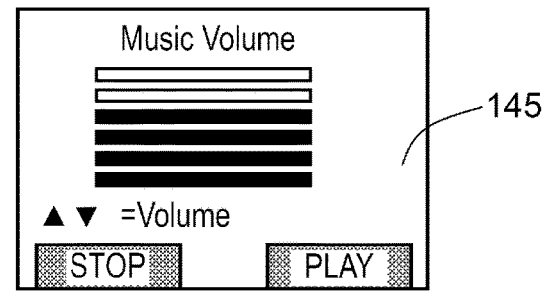
FIG. 7C is a schematic diagram illustrating an example of a relationship between state changes and screen transition in the cordless telephone slave device according to the exemplary embodiment of the invention.

FIGS. 7A to 7C are schematic diagrams illustrating an example of a relationship between state changes in CDL slave device 200 and transition of a remote control screen of display 145. FIG. 7A is a schematic diagram illustrating a screen example of a remote control screen in a case where portable music player 30 is in a reproduction state. FIG. 7B is a schematic diagram illustrating a screen example of a remote control screen in a case where portable music player 30 is in a paused state. FIG. 7C is a schematic diagram illustrating a screen example of a remote control screen in a case where portable music player 30 is in a sound volume adjustment state. In FIG. 7A, a portion of operator 144 is displayed together with a remote control screen displayed on display 145. In FIGS. 7B and 7C, a portion of operator 144 is not illustrated.

Slave device remote controller 111 edits remote control screen information in accordance with state information and musical piece information which are acquired from portable music player 30, and transmits the remote control screen information to CDL slave device 200 through CDL wireless I/F unit 107.

In addition, for example, when the state or musical piece of portable music player 30 changes in accordance with an operation in portable music player 30 or a remote control operation from CDL slave device 200, CDL master device 100 is sequentially notified of state information or musical piece information, and CDL master device 100 detects a change in state information or musical piece information. The change in state information or musical piece information is reflected on the remote control screen of CDL slave device 200. Meanwhile, the state information or musical piece information may be given notice of by CDL slave device 200 in accordance with a key operation in CDL slave device 200.

In FIGS. 7A and 7B, for example, pieces of information, such as a music name to be reproduced (Music Name), a title name including music to be reproduced (for example, an album name (Album Name)), an artist name related to music to be reproduced (Player Name), operation guidance of a remote controller, and functions allocated to soft keys, are included in order from the uppermost row. The soft keys include, for example, a left soft key (SOFT_L) and a right soft key (SOFT_R).

As illustrated in FIG. 7A, operator 144 includes left soft key 144*a*, right soft key 144*b*, call key 144*c*, call termination key 144*d*, navigation key (cross key) 144*e*, and dial key 144*f*.

In FIGS. 7A to 7C, in navigation key 144*e*, for example, a function of instructing an increase in sound volume and a function of instructing a decrease in sound volume are allocated to an upward key and a downward key, respectively. In FIGS. 7A and 7B, in navigation key 144*e*, for example, a function of instructing repetition (Repeat) and a function of instructing skipping (Skip) are allocated to a leftward key and a rightward key, respectively.

In FIG. 7A, for example, a function of instructing the stop of reproduction (STOP) and a function of instructing the pause of reproduction (PAUSE) are allocated to left soft key 144*a* and right soft key 144*b*, respectively. In FIG. 7B, for example, a function of instructing the stop of reproduction (STOP) and a function of instructing reproduction (PLAY) are allocated to left soft key 144*a* and right soft key 144*b*, respectively.

According to an operation of CDL system 1 during a remote control operation, in a case where portable music player 30 reproduces sound data, speakers 129 and 130 of CDL master device 100 can be used as external speakers. For this reason, a user can output sound data using speakers 129 and 130 of CDL master device 100 even when the user does not purchase a dedicated external speaker and does not connect the dedicated external speaker to portable music player 30.

In addition, in a case where sound data from portable music player 30 is reproduced, CDL slave device 200 can be used as a remote controller that remotely operates portable music player 30. CDL slave device 200 has few restrictions on, for example, the shape or size thereof, and thus the CDL slave device is easily gripped and has satisfactory operability. Therefore, even when portable music player 30 is difficult to operate, it is possible to improve the operability thereof by performing association so as to use CDL slave device 200 as a remote controller.

In addition, since state information and musical piece information of portable music player 30 can be transmitted to CDL slave device 200, a user can easily instruct a remote operation of sound data using CDL slave device 200.

In addition, for example, CDL master device 100 and portable music player 30 are connected to each other in a wireless manner, and may not be physically connected to each other. For example, in a case where a user performs various operations (for example, the adjustment of sound volume, the selection of a musical piece, the start of reproduction, and the stop of reproduction), the user does not need to move to the vicinity of CDL master device 100 from a position where the user's viewing is performed to operate portable music player 30, thereby allowing operability to be improved.

In this manner, it is possible to improve association between portable music player 30 and CDL apparatus 10 in a case where sound data is reproduced by portable music player 30 and to realize a comfortable viewing environment.

Next, a description will be given of an operation example during the outgoing of a telephone call from a fixed telephone network or during the incoming of a telephone call to the fixed telephone network while sound stream data from portable music player 30 is reproduced and output to speakers 129 and 130 of CDL master device 100 in CDL system 1.

CDL apparatus 10 may operate as a telephone apparatus that does not include a cordless telephone slave device, during the outgoing of a telephone call or during the incoming of a telephone call.

Figure 8:
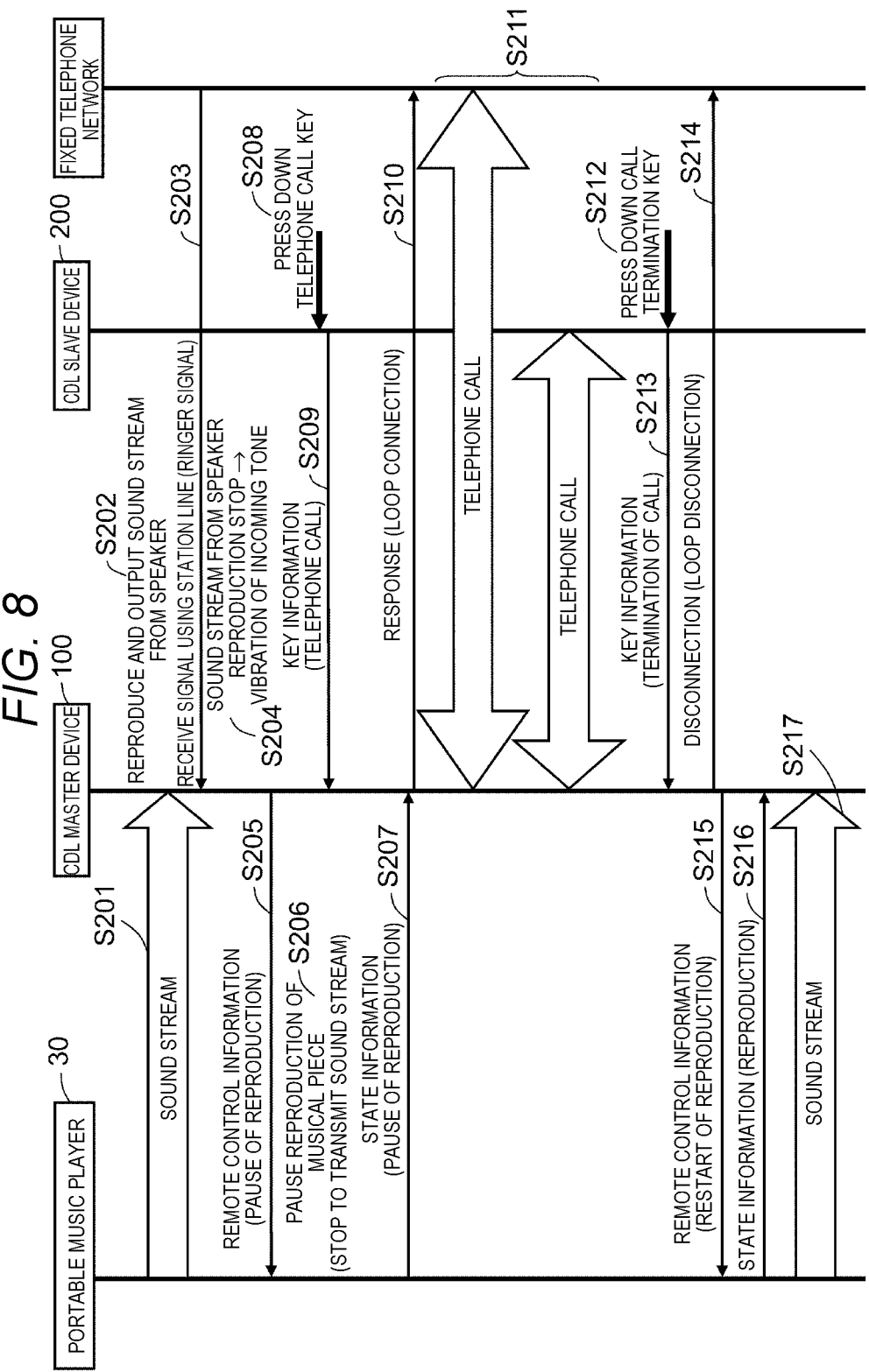
FIG. 8 is a sequence diagram illustrating a first operation example during the incoming of a telephone call in a case where the cordless telephone apparatus and the portable music player are associated with each other, according to the exemplary embodiment of the invention.

FIG. 8 is a sequence diagram illustrating a first operation example during the incoming of a telephone call in a case where CDL master device 100, CDL slave device 200, and portable music player 30 are associated with each other. In FIG. 8, CDL slave device 200 responds to the incoming of a telephone call received from another telephone apparatus 70 through a fixed telephone network, but CDL master device 100 may respond to the incoming of a telephone call. Here, steps different from the steps in FIG. 4 will be described, and the same steps as the steps in FIG. 4 will be denoted by the same reference numerals and signs, and a description thereof will be omitted or simplified.

First, although not shown in FIG. 8, the processes of S101 to S111 of FIG. 4 are performed.

Subsequently, portable music player 30 sequentially transmits sound data which is included in portable music player 30 or which is capable of being referred to by the portable music player to CDL master device 100 as, for example, sound stream data (S201).

In CDL master device 100, Bluetooth (registered trademark) controller 123 receives sound stream data from portable music player 30 through Bluetooth (registered trademark) communication I/F unit 124. The sound stream data is input to sound input and output controller 104 through a sound bus, is converted into an analog signal, and is output as a sound from speakers 129 and 130 (S202).

Therefore, in a case where portable music player 30 reproduces music, speakers 129 and 130 of CDL master device 100 can be used as external speakers.

In a case where call controller 110 receives a signal using a station line from a fixed telephone network through fixed telephone line I/F unit 101 while the sound stream data acquired from portable music player 30 is reproduced and output (S203), the call controller restricts the output of sound stream data to speakers 129 and 130, and instructs speakers 129 and 130 to vibrate an incoming tone through sound input and output controller 104 (S204). A case where a signal is received using a station line from a fixed telephone network is a case where call controller 110 detects the incoming of a call. The restriction of output of sound stream data includes, for example, a reduction or stop of the output of sound stream data. The incoming tone is vibrated by, for example, at least one of CDL master device 100 and CDL slave device 200.

In S204, for example, output through speakers 129 and 130 may be restricted by making sound stream processor 112 restrict the output of sound stream data. For example, sound stream processor 112 may continuously output sound stream data, and sound input and output controller 104 may restrict the output of sound stream data through speakers 129 and 130.

For example, the vibration of the incoming tone through speakers 129 and 130 is performed after the output of sound stream data through speakers 129 and 130 is restricted, but the above-mentioned vibration timing and restriction timing may slightly overlap each other. In addition, an incoming call may be presented to a user by a method (for example, vibration and light emission) other than the vibration of an incoming tone.

In S203, when a signal is received using a station line from a fixed telephone network by fixed telephone line I/F unit 101, the reception of the signal using the station line is detected by call controller 110, and call controller 110 instructs music player controller 113 to pause reproduction in order to instruct the music player controller to perform a remote control operation for pausing reproduction. Music player controller 113 transmits AVRCP remote control information (pause of reproduction) through Bluetooth (registered trademark) controller 123 (S215). The remote control information includes information (reproduction pause information) for instructing portable music player 30 to pause reproduction.

For example, whether to pause the reproduction of sound stream data in a case where a signal is received using a station line may be set in advance or may be able to be stored in storage 103 as program setting information through operator 105 of CDL master device 100 or operator 144 of CDL slave device 200 when the signal is received using the station line.

When portable music player 30 receives the reproduction pause information from CDL master device 100, the portable music player pauses the reproduction of sound stream data and stops transmitting the sound stream data (S206).

When portable music player 30 pauses the reproduction of sound data, the portable music player transmits AVRCP state information (pause) including the transition of the state of portable music player 30 to "pause" to CDL master device 100 (S207).

In CDL slave device 200, a user operates operator 144 and presses down a key (for example, a call key) for responding to the reception of a signal using a station line, and operator 144 detects the pressing-down of the call key (S208). In a case where the call key is pressed down, CDL master device 100 is notified of a key information message (telephone call) through CDL wireless IT unit 148 in CDL slave device 200 (S209).

In CDL master device 100, when call controller 110 receives the key information message (telephone call) from CDL slave device 200 through CDL wireless IT unit 107, the call controller instructs fixed telephone line I/F unit 101 to form a station line loop and responds to an incoming call (S210). Thereby, CDL slave device 200 can perform conversation with a telephone apparatus (not shown) which is a call outgoing source through CDL master device 100 and a fixed telephone network (S211).

In a case where a telephone call is terminated and a user operates operator 144 and presses down a key (for example, a call termination key) for terminating the telephone call, operator 144 detects the pressing-down of the call termination key (S212). In a case where the call termination key is pressed down, CDL wireless I/F unit 148 notifies CDL master device 100 of a key information message (call termination) in CDL slave device 200 (S213).

In CDL master device 100, when call controller 110 receives the key information message (call termination) from CDL slave device 200 through CDL wireless I/F unit 107, the call controller gives an instruction for disconnecting a station line loop formed in fixed telephone line I/F unit 101 (S214). Thereby, CDL slave device 200 disconnects a telephone call with a telephone apparatus (not shown) which is a call outgoing source through CDL master device 100 and a fixed telephone network.

In CDL master device 100, when call controller 110 receives the key information message (call termination) from CDL slave device 200 through CDL wireless I/F unit 107, the call controller instructs music player controller 113 to restart reproduction in order to instruct the music player controller to perform a remote control operation for restarting reproduction. Music player controller 113 transmits AVRCP remote control information (restart of reproduction) to portable music player 30 through Bluetooth (registered trademark) controller 123 (S215).

When portable music player 30 receives the remote control information (restart of reproduction) and restarts the reproduction of sound data, the portable music player transmits state information including the transition of the state of portable music player 30 to "reproduction" to CDL master device 100 (S216).

When portable music player 30 receives remote control information including reproduction restart information from CDL master device 100, the portable music player restarts the transmission of the sound stream data transmitted in S202 to CDL master device 100 (S217).

According to the first operation example during the incoming of a telephone call, in a case where CDL master device 100 or CDL slave device 200 receives a telephone call, the output of sound stream data through a speaker is restricted, and thus it is possible to suppress the influence of sound stream data on the incoming of a telephone call or a telephone call due to the output of a sound. Therefore, it is possible to operate speakers 129 and 130 of CDL master device 100 as external speakers and to easily listen to a sound during the incoming of a telephone call or during a telephone call.

In addition, it is possible to designate an operation (for example, whether to restart reproduction) of portable music player 30 after the termination of a telephone call, using remote control information. Therefore, for example, in a case where a user desires to view a musical piece from portable music player 30 after the termination of a telephone call, it is possible to restart the reproduction of the musical piece and to improve the user's convenience.

In the first operation example during the incoming of a telephone call which is illustrated in FIG. 8, CDL slave device 200 may initiatively associate portable music player 30 and CDL master device 100 with each other as illustrated in FIG. 6 and may start up a music application of portable music player 30.

Figure 9:
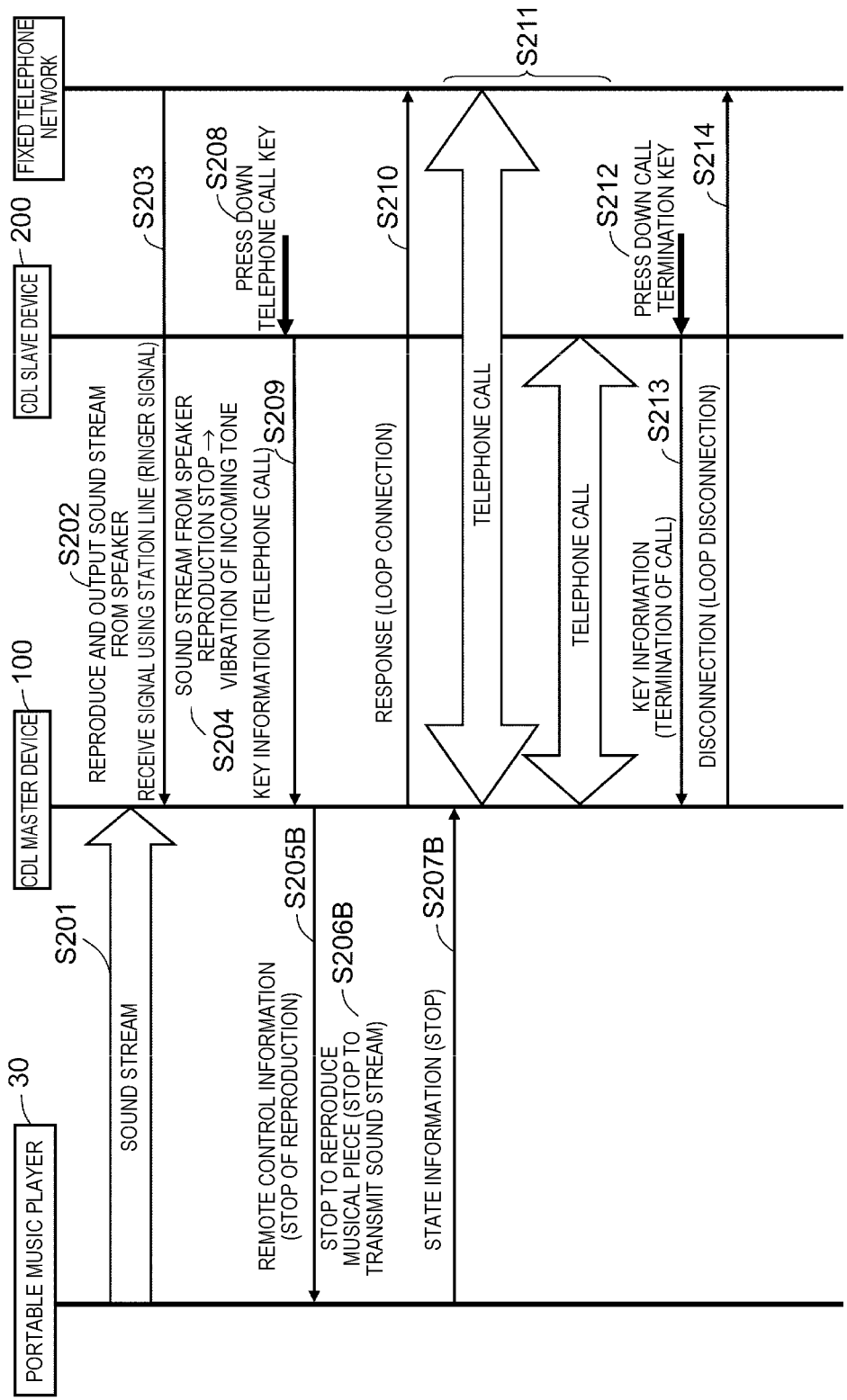
FIG. 9 is a sequence diagram illustrating a second operation example during the incoming of a telephone call in a case where the cordless telephone apparatus and the portable music player are associated with each other, according to the exemplary embodiment of the invention.

FIG. 9 is a sequence diagram illustrating a second operation example during the incoming of a telephone call in a case where CDL master device 100, CDL slave device 200, and portable music player 30 are associated with each other.

The second operation example during the incoming of a telephone call is the same as the first operation example during the incoming of a telephone call which is illustrated in FIG. 8, but both the examples differ in information included in remote control information transmitted to portable music player 30 from CDL master device 100 during the incoming of a call. In the second operation example during the incoming of a telephone call, processes of S205B to S207B are performed instead of the processes of S205 to S207, and the processes of S215 to S217 are not performed. Here, steps different from the steps in FIG. 8 will be described, and the same steps as the steps in FIG. 8 will be denoted by the same reference numerals and signs, and a description thereof will be omitted or simplified.

In S205B, in CDL master device 100, in a case where call controller 110 receives a signal using a station line from a fixed telephone network through fixed telephone line I/F unit 101 in S203, music player controller 113 transmits AVRCP remote control information (stop of reproduction) through Bluetooth (registered trademark) controller 123. The remote control information includes information (reproduction stop information) for stopping reproduction by portable music player 30 (S205B). At this time, call controller 110 stores the fact that music player controller 113 is instructed to transmit reproduction stop information, for example, in storage 103.

For example, whether to stop the reproduction of sound stream data in a case where a signal is received using a station line may be set in advance or may be set through operator 105 when the signal is received using the station line.

When portable music player 30 receives the remote control information (stop of reproduction) from CDL master device 100, the portable music player stops reproducing a musical piece and stops transmitting the sound stream data (S206B).

When portable music player 30 stops reproducing sound data, the portable music player transmits AVRCP state information (stop) including the transition of the state of portable music player 30 to "stop" to CDL master device 100 (S207B).

In CDL master device 100, when call controller 110 receives a key information message (call termination) indicating the termination of a telephone call from CDL slave device 200 through CDL wireless I/F unit 107, the call controller does not transmit remote control information including reproduction restart information to music player controller 113 in a case where the transmission of reproduction stop information is stored in storage 103. Therefore, the transmission of sound stream data is not restarted by portable music player 30, and the reproduction of sound data is not restarted by CDL master device 100.

According to the second operation example during the incoming of a telephone call, in a case where CDL master device 100 or CDL slave device 200 receives a telephone call, the output of sound stream data through a speaker is restricted, and thus it is possible to suppress the influence of sound stream data on the incoming of a telephone call or telephone conversation due to the output of a sound. Therefore, it is possible to operate speakers 129 and 130 of CDL master device 100 as external speakers and to easily listen to a sound during the incoming of a telephone call or during a telephone call.

In addition, it is possible to designate an operation (for example, whether to restart reproduction) of portable music player 30 after the termination of a telephone call, using remote control information. Therefore, for example, in a case where a user does not desire to view a musical piece after the termination of a telephone call, it is possible to prevent the reproduction of the musical piece from being restarted and to improve the user's convenience.

Figure 10:
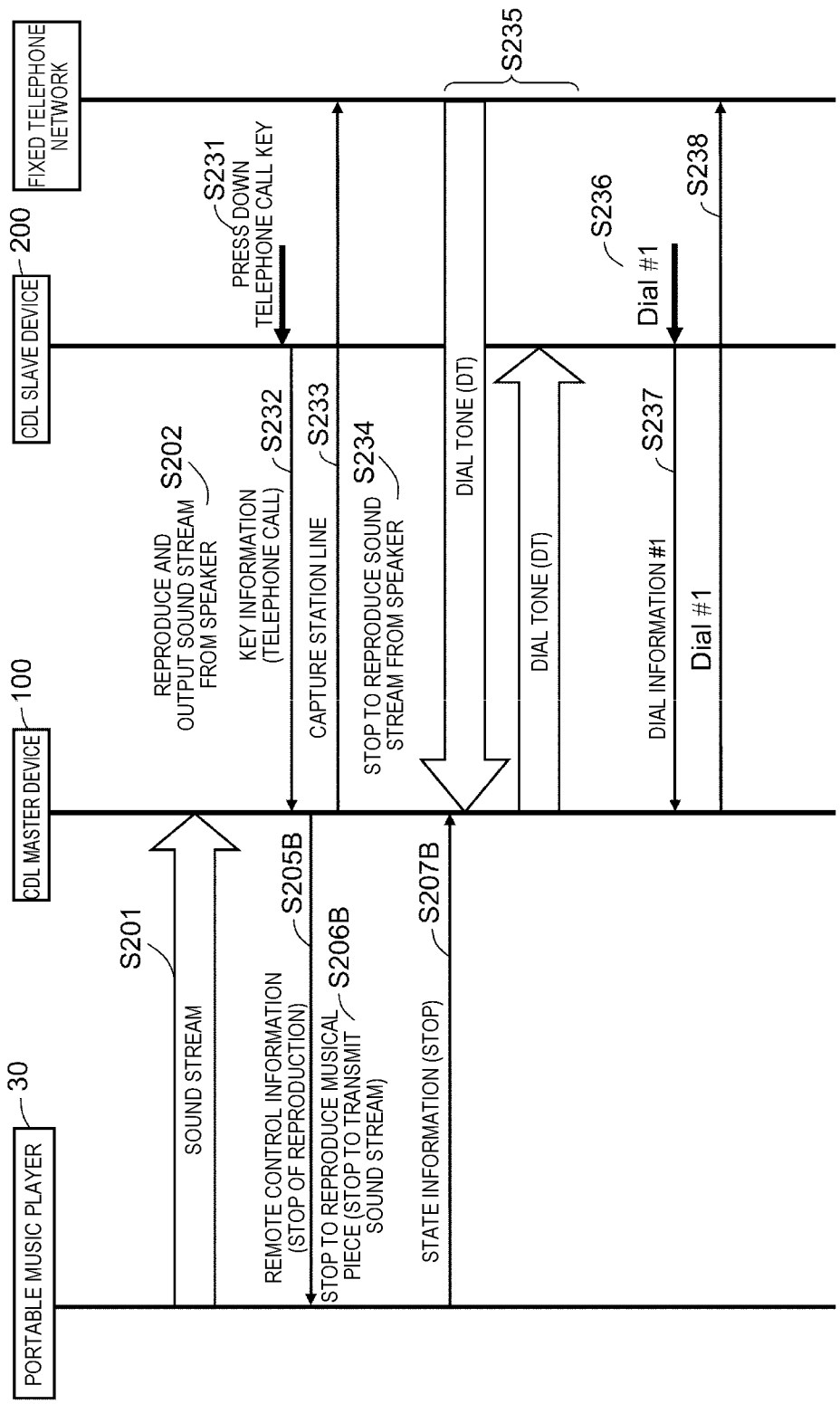
FIG. 10 is a sequence diagram illustrating an operation example during the outgoing of a telephone call in a case where the cordless telephone apparatus and the portable music player are associated with each other, according to the exemplary embodiment of the invention.

FIG. 10 is a sequence diagram illustrating an operation example during the outgoing of a telephone call in a case where CDL master device 100, CDL slave device 200, and portable music player 30 are associated with each other.

In FIG. 10, CDL slave device 200 transmits a telephone call to another telephone apparatus 70 through a fixed telephone network during the reproduction and output of a sound stream from portable music player 30, but CDL master device 100 may transmit a telephone call. In FIG. 10, steps different from the steps in FIG. 8 will be described, and the same steps as the steps in FIG. 8 will be denoted by the same reference numerals and signs, and a description thereof will be omitted or simplified.

First, although not shown in FIG. 10, the processes of S101 to S111 of FIG. 4 are performed. Subsequently, the processes of S201 and S202 of FIG. 8 are performed.

While sound stream data acquired from portable music player 30 is reproduced and output in CDL master device 100, it is assumed that a user operates operator 144 and presses down a key (for example, a call key) for transmitting a signal using a station line in CDL slave device 200 and that operator 144 detects the pressing-down of the call key (S231).

In a case where the call key is pressed down, CDL wireless I/F unit 148 notifies CDL master device 100 of a key information message (telephone call) (S232).

In CDL master device 100, when call controller 110 receives the key information message (telephone call) from CDL slave device 200 through CDL wireless I/F unit 107, the call controller instructs music player controller 113 to perform a remote control operation for stopping or pausing reproduction and transmits remote control information to portable music player 30 through Bluetooth (registered trademark) controller 123 (S205B). The remote control information includes, for example, reproduction stop information or reproduction pause information. FIG. 10 illustrates a case where the remote control information includes reproduction stop information.

When portable music player 30 receives reproduction stop information from CDL master device 100, the portable music player stops reproducing a musical piece and stops transmitting sound stream data (S206B).

When portable music player 30 stops reproducing sound data, the portable music player transmits state information (stop) including the transition of the state of portable music player 30 to "stop" to CDL master device 100 (S207B).

In CDL master device 100, when call controller 110 receives a key information message (telephone call) from CDL slave device 200 through CDL wireless I/F unit 107, the call controller confirms the state of CDL slave device 200, detects that an operation of transmitting a signal using a station line has been performed because a call key has been pressed down in an idle state of the slave device, and captures a station line through fixed telephone line I/F unit 101 (S233). The process of S233 may be performed prior to the process of S205B.

When the station line is captured, call controller 110 restricts the output of sound stream data from speakers 129 and 130 (S234). The restriction of output of the sound stream data includes the stop of output of the sound stream data.

In S234, for example, sound stream processor 112 may restrict the output of the sound stream data, so that the output through speakers 129 and 130 may be restricted. For example, sound stream processor 112 may continuously output the sound stream data, and sound input and output controller 104 may perform restriction so that the sound volume of the sound stream data which is output through speakers 129 and 130 is reduced.

When the station line is captured by CDL wireless I/F unit 107, sound input and output controller 143 makes speaker 152 output a dial tone (DT) acquired through a fixed telephone network and CDL master device 100 in CDL slave device 200 (S235).

Subsequently, for example, operator 144 receives a dial operation (for example, Dial#1) (S236), and CDL wireless I/F unit 148 transmits dial information (for example, dial information #1) to CDL master device 100 (S237). The dial information includes information regarding a dial operation.

In CDL master device 100, when call controller 110 receives dial information from CDL slave device 200 through CDL wireless I/F unit 107, the call controller can transmit the information regarding a dial operation to the fixed telephone network through fixed telephone line I/F unit 101 and can transmit a telephone call (S238). Thereby, a telephone call can be performed by a telephone apparatus, which is a call outgoing destination, performing a predetermined call incoming process.

According to a third operation example during the outgoing of a telephone call, in a case where CDL master device 100 or CDL slave device 200 transmits a telephone call, the output of sound stream data through a speaker is restricted, and thus it is possible to suppress the influence of sound stream data on the outgoing of a telephone call or a telephone call due to the output of a sound. Therefore, it is possible to operate speakers 129 and 130 of CDL master device 100 as external speakers and to easily listen to a sound during the outgoing of a telephone call or during a telephone call.

In FIG. 10, remote control information including reproduction stop information is transmitted during the outgoing of a call, but remote control information including reproduction pause information may be transmitted. In this case, in a case where CDL apparatus 10 terminates a telephone call accompanied by the outgoing of a telephone call, portable music player 30 restarts the reproduction of sound stream data and restarts the transmission of the sound stream data.

In FIGS. 8 to 10, CDL slave device 200 is not omitted, but CDL slave device 200 may be omitted. In this case, CDL master device 100 may receive or transmit a telephone call. Even in this case, the same effects as those described above are obtained.

According to an operation of CDL system 1 during the incoming of a telephone call or during the outgoing of a telephone call, in a case where portable music player 30 reproduces sound data, speakers 129 and 130 of CDL master device 100 can be used as external speakers. For this reason, a user can output sound data reproduced by portable music player 30, using speakers 129 and 130 of CDL master device 100 even when the user does not purchase a dedicated external speaker and does not connect the dedicated external speaker to portable music player 30.

In addition, even when a telephone call is received or transmitted while speakers 129 and 130 of CDL master device 100 are used as external speakers, a user restricts the output of sound data from portable music player 30 through speakers 129 and 130 without performing a special operation. Therefore, it is possible to prevent a telephone call from being difficult to perform due to the output of music through a speaker without a user's special operation and to make it easy to listen to a speech sound.

In this manner, it is possible to improve association between portable music player 30 and CDL apparatus 10 in a case where sound data is reproduced by portable music player 30 and to realize a comfortable viewing environment and telephone call environment.

Meanwhile, the invention is not limited to the configuration of the above-described exemplary embodiment, and can also be applied to any configuration insofar as the configuration is capable of achieving the functions described in claims or the functions included in the configuration of this exemplary embodiment.

For example, in the above-described exemplary embodiment, CDL slave device 200 starts to operate as a remote controller in accordance with the pressing-down of an association key, but may start to operate as a remote controller by other triggers. The other triggers include, for example, a case where an instruction for starting association is received from a communication destination of CDL slave device 200 and a case where the start of association at a predetermined time is set in advance. In addition, the invention is not limited to the association key, and the same is true of other keys.

For example, in the above-described exemplary embodiment, a telephone call using a fixed telephone line is described, but the invention can also be applied to a telephone call using any of other telephone lines (for example, an IP telephone line).

For example, in the above-described exemplary embodiment, a user's operation with respect to CDL slave device 200 is visually assisted using a remote control screen, but may be assisted using another means (for example, a sound). For example, CDL master device 100 may generate remote control sound information instead of remote control screen information, and CDL slave device 200 may transmit the remote control sound information. Thereby, a user of CDL slave device 200 may listen to the remote control sound information and may present a remote operation through sound recognition using, for example, microphone 151.

For example, in the above-described exemplary embodiment, portable music player 30 transmits sound data (for example, data of a musical piece) to CDL master device 100, but may transmit video data including sound data and image data. In other words, sound data may include sound components of the video data.

For example, in the above-described exemplary embodiment, storage 103 of CDL master device 100 may store, as program setting information, whether or not remote control information includes information for instructing the pause of reproduction or includes information for instructing the stop of reproduction during the outgoing of a telephone call or during the incoming of a telephone call. Call controller 110 may designate whether to make portable music player 30 pause or stop reproduction, in accordance with the program setting information.

Exemplary embodiments may be appropriately combined with each other.

Summary of Aspect of the Invention

A telephone apparatus according to an aspect of the invention is a telephone apparatus that is connected to a telephone line and handles outgoing and incoming of a call through the telephone line. The telephone apparatus includes a first wireless communicator that performs wireless communication of data with a music reproducing device, a first controller that manages a state of the music reproducing device through the first wireless communicator and transmits remote control information for remotely controlling the music reproducing device to the music reproducing device, a speaker that outputs sound data as a sound, a sound processor that reproduces sound data received from the music reproducing device and outputs the sound data to the speaker, and a call controller that detects outgoing or incoming of a call through the telephone line and restricts output of sound data from the music reproducing device in a case where the outgoing or incoming of a call is detected while the sound data is output as a sound through the speaker.

According to this configuration, it is possible to output sound data capable of being reproduced by the music reproducing device using the speaker of the telephone apparatus. In addition, even when a user does not perform a special operation, it is possible to suppress influence on a telephone call due to the output of sound data through the speaker. Therefore, it is possible to improve association between the music reproducing device and the telephone apparatus in a case where sound data is reproduced by the music reproducing device. Accordingly, for example, it is possible to realize a comfortable viewing environment and telephone call environment of sound data.

In the telephone apparatus according to the aspect of the invention, the call controller instructs the first controller to notify the music reproducing device of the remote control information for restricting output of sound data in a case where the outgoing or incoming of a call through the telephone line is detected while sound data from the music reproducing device is reproduced and output to the speaker.

According to this configuration, even when a user does not perform a special operation, it is possible to suppress influence on a telephone call due to the output of sound data through the speaker in the telephone apparatus by restricting the output of sound data by remote control with respect to the music reproducing device. Therefore, it is possible to improve association between the music reproducing device and the telephone apparatus in a case where sound data is reproduced by the music reproducing device. Accordingly, for example, it is possible to realize a comfortable viewing environment and telephone call environment of sound data.

In the telephone apparatus according to the aspect of the invention, in a case where the outgoing or incoming of a call through the telephone line is detected, the remote control information notified to the music reproducing device is information for instructing the music reproducing device to stop or pause reproduction.

According to this configuration, since the transmission of sound data of which output as a sound is restricted is stopped, the processing load of the music reproducing device and the telephone apparatus is reduced, and thus it is possible to suppress influence on a telephone call due to the output of sound data through the speaker.

In the telephone apparatus according to the aspect of the invention, in a case where the outgoing or incoming of a call through the telephone line is detected, the call controller designates which of reproduction stop and reproduction pause the music reproducing device is instructed to perform, in accordance with program setting information stored in the telephone apparatus.

According to this configuration, for example, it is possible to determine in advance whether to restart the reproduction of sound data from the music reproducing device in the telephone apparatus after the termination of a call, and to improve a user's convenience.

In the telephone apparatus according to the aspect of the invention, in a case where termination of the outgoing or incoming of a call is detected, the first controller gives notice of remote control information for instructing the music reproducing device to start reproduction, and the sound processor reproduces sound data received from the music reproducing device and outputs the sound data to the speaker.

According to this configuration, it is possible to easily restart the output of sound data through the speaker in accordance with the termination of a telephone call. Therefore, even when a user does not perform a special operation, it is possible to restart the provision of a viewing environment of sound data.

In the telephone apparatus according to the aspect of the invention, the first controller instructs the music reproducing device to pause reproduction when the outgoing or incoming of a call through the telephone line is detected, and then instructs the music reproducing device to start reproduction in a case where termination of the outgoing or incoming of a call is detected. The first controller instructs the music reproducing device to stop reproduction when the outgoing or incoming of a call through the telephone line is detected, and then does not instruct the music reproducing device to start reproduction in a case where termination of the outgoing or incoming of a call is detected.

According to this configuration, it is possible to designate whether or not the transmission of sound data from the music reproducing device is required to be restarted, in accordance with an instruction (stop or pause) for remote control during the incoming or outgoing of a call.

In the telephone apparatus according to the aspect of the invention, in a case where the call controller detects incoming of a call through the telephone line while sound data from the music reproducing device is output to the speaker, the call controller stops reproducing the sound data received from the music reproducing device and outputs an incoming tone from the speaker.

According to this configuration, even in a case where sound data is output, it is possible to recognize the presence of an incoming call or outgoing call, and to smoothly perform transition from a viewing state of the sound data to a telephone call state.

The telephone apparatus according to the aspect of the invention further includes a cordless telephone slave device and a cordless telephone master device. The cordless telephone master device includes the first wireless communicator, the first controller, the speaker, the sound processor, a second wireless communicator that performs wireless communication of data with the cordless telephone slave device, and a second controller that operates the cordless slave device as an operator for remotely controlling the music reproducing device through the second wireless communicator.

According to this configuration, it is possible to remotely control the music reproducing device using the cordless telephone slave device. In addition, a user does not need to move whenever the user operates the music reproducing device, and thus it is possible to improve the user's convenience. Even in a case where it is difficult to operate the music reproducing device itself, it is possible to realize satisfactory operability by the cordless telephone slave device.

In the telephone apparatus according to the aspect of the invention, a communication system of the first wireless communicator includes a communication system based on an IEEE802.15.1 standard.

According to this configuration, since it is not necessary to connect the music reproducing device and the telephone apparatus to each other in a wired manner, a user does not need to move whenever the user operates the music reproducing device. Therefore, it is possible to improve the user's convenience in a case where sound data of the music reproducing device is output as a sound through the speaker of the telephone apparatus. In addition, it is also possible to improve the degree of freedom of a place where the music reproducing device is to be disposed, in a case where the music reproducing device is associated with the telephone apparatus.

A telephone system according to another aspect of the invention is a telephone system including a telephone apparatus and a music reproducing device. The telephone apparatus includes a first wireless communicator that performs wireless communication of data with the music reproducing device, a first controller that manages a state of the music reproducing device and remotely controls the music reproducing device through the first wireless communicator, a speaker that outputs sound data as a sound, a sound processor that reproduces sound data from the music reproducing device received by the first wireless communicator and outputs the sound data to the speaker, and a call controller that detects outgoing or incoming of a call through a telephone line and restricts output of sound data from the music reproducing device in a case where the outgoing or incoming of a call is detected while the sound data is output as a sound by the speaker. The music reproducing device includes a third wireless communicator that performs wireless communication of data with the telephone apparatus, a sound data reproducer that reproduces sound data, a sound data transmitter that transmits sound data reproduced by the sound data reproducer to the telephone apparatus as a sound stream, and a third controller that restricts an operation of the music reproducing device in accordance with remote control information received from the telephone apparatus.

According to this configuration, it is possible to output sound data capable of being reproduced by the music reproducing device using the speaker of the telephone apparatus. In addition, even when a user does not perform a special operation, it is possible to suppress influence on a telephone call due to the output of sound data through the speaker. Therefore, it is possible to improve association between the music reproducing device and the telephone apparatus in a case where sound data is reproduced by the music reproducing device. Accordingly, for example, it is possible to realize a comfortable viewing environment and telephone call environment of sound data.

In addition, a control method according to still another aspect of the invention is a control method in a telephone apparatus. The control method includes performing wireless communication of data with a music reproducing device, managing a state of the music reproducing device and remotely controlling the music reproducing device through wireless communication, reproducing sound data received from the music reproducing device and outputting the sound data to a speaker, detecting outgoing or incoming of a call through a telephone line, and restricting output of sound data from the music reproducing device in a case where incoming or outgoing of a call is detected while the sound data is output as a sound by the speaker.

According to this method, it is possible to output sound data capable of being reproduced by the music reproducing device using the speaker of the telephone apparatus. In addition, even when a user does not perform a special operation, it is possible to suppress influence on a telephone call due to the output of sound data through the speaker. Therefore, it is possible to improve association between the music reproducing device and the telephone apparatus in a case where sound data is reproduced by the music reproducing device. Accordingly, for example, it is possible to realize a comfortable viewing environment and telephone call environment of sound data.

The invention is useful for a telephone apparatus, a telephone system, and a control method which are capable of improving association between a music reproducing device and a telephone apparatus in a case where sound data is reproduced by the music reproducing device.

What is claimed is:

1. A telephone apparatus, connectable to a telephone network to handle outgoing and incoming calls through the telephone network, the telephone apparatus comprising:
   one or more of cordless telephone slave devices; and
   a cordless telephone master device, which is configured to control the one or more of the cordless telephone slave devices, wherein:
   the cordless telephone master device includes a wireless communicator that performs wireless reception of music data from a portable music player, wherein the portable music player is separate from the telephone apparatus, and that performs wireless transmission of control information to the portable music player;
   the cordless telephone master device integrally includes a speaker that outputs the music data received via the wireless communicator from the portable music player; and
   the cordless telephone master device includes a controller, which
   in response to detecting an outgoing call originating from the one of the cordless telephone slave devices to the telephone network while the speaker is outputting the music data received from the portable music player, transmits the control information via the wireless communicator to the portable music player to suspend output of the music data and processes the outgoing call to support voice communication on the one of the cordless telephone slave devices, and
   in response to detecting termination of the voice communication on the one of the cordless telephone slave devices, transmits the control information via the wireless communicator to the portable music player to resume output of the music data via the wireless communicator to the speaker to thereby resume output of the music data from the speaker.

2. The telephone apparatus of claim 1, wherein the wireless communicator is in compliance with an IEEE802.15.1 standard.

3. A method of controlling operation of a telephone apparatus, connectable to a telephone network to handle outgoing and incoming calls through the telephone network, wherein the telephone apparatus includes one or more of cordless telephone slave devices and a cordless telephone master device, the cordless telephone master device controls the one or more of the cordless telephone slave devices, and the cordless telephone master device integrally includes a speaker, the method comprising:
   the cordless telephone master device wirelessly receiving music data from a portable music player, wherein the portable music player is separate from the telephone apparatus;
   the cordless telephone master device outputting the music data received from the portable music player via the speaker of the cordless telephone master device;
   in response to detecting outgoing call originating from the one of the cordless telephone slave devices to the telephone network while the speaker is outputting the music data received from the portable music player, wirelessly transmitting control information to the portable music player to suspend output of the music data and processing the outgoing call to support voice communication on the one of the cordless telephone slave devices; and in response to detecting termination of the voice communication on the one of the cordless telephone slave devices, wirelessly transmitting control information to the portable music player to resume output of the music data to thereby resume output of the music data from the speaker of the cordless telephone master device.

4. The method of claim 3, wherein the cordless telephone master device wirelessly receiving the music data from, and wirelessly transmitting the control information to, the portable music player pursuant to an IEEE802.15.1 standard.

* * * * *